United States Patent
Di Cairano et al.

(10) Patent No.: US 11,650,590 B2
(45) Date of Patent: May 16, 2023

(54) ADAPTIVE OPTIMIZATION OF DECISION MAKING FOR VEHICLE CONTROL

(71) Applicant: Mitsubishi Electric Research Laboratories, Inc., Cambridge, MA (US)

(72) Inventors: Stefano Di Cairano, Somerville, MA (US); Rien Quirynen, Boston, MA (US); Yunus Emre Sahin, Ann Arbor, MI (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 188 days.

(21) Appl. No.: 16/830,601

(22) Filed: Mar. 26, 2020

(65) Prior Publication Data
US 2021/0302974 A1    Sep. 30, 2021

(51) Int. Cl.
*G05D 1/02* (2020.01)
*B60W 60/00* (2020.01)

(52) U.S. Cl.
CPC ....... *G05D 1/0214* (2013.01); *B60W 60/0011* (2020.02); *B60W 60/0015* (2020.02); *G05D 1/0217* (2013.01)

(58) Field of Classification Search
None
See application file for complete search history.

(56) References Cited

U.S. PATENT DOCUMENTS

| | | | | |
|---|---|---|---|---|
| 10,671,076 | B1* | 6/2020 | Kobilarov | G08G 1/166 |
| 11,231,715 | B2* | 1/2022 | Tahir | B60W 50/0097 |
| 2018/0005118 | A1* | 1/2018 | Kapoor | G06F 21/50 |
| 2020/0111005 | A1* | 4/2020 | Ghosh | G06N 3/084 |
| 2020/0379893 | A1* | 12/2020 | Arechiga Gonzalez | G06N 5/02 |
| 2021/0123753 | A1* | 4/2021 | Liu | G01C 21/3415 |

OTHER PUBLICATIONS

Donze, "On Signal Temporal Logic", University of California, Berkeley, Feb. 3, 2014, p. 22-37 (Year: 2014).*
Karlsson et al., "Temporal vs. spatial formulation of autonomous overtaking algorithms", 2016 IEEE 19th International Conference on Intelligent Transportation Systems (ITSC), Rio de Janeiro, Brazil, Nov. 1-4, 2016, p. 1029-1034 (Year: 2016).*

* cited by examiner

*Primary Examiner* — Tamara L Weber
(74) *Attorney, Agent, or Firm* — Gennadiy Vinokur; Hironori Tsukamoto

(57) ABSTRACT

A control system for controlling a motion of a vehicle to a target driving goal uses a decision-maker configured to determine a sequence of intermediate goals leading to the next target goal by optimizing the motion of the vehicle subject to a first model and tightened driving constraints formed by tightening driving constraints by a safety margin, and uses a motion planner configured to determine a motion trajectory of the vehicle tracking the sequence of intermediate goals by optimizing the motion of the vehicle subject to the second model. The driving constraints include mixed logical inequalities of temporal logic formulae specified by traffic rules to define an area where the temporal logic formulae are satisfied, while the tightened driving constraints shrink the area by the safety margin, which is a function of a difference between the second model and the first model approximating the second model.

15 Claims, 14 Drawing Sheets

Algorithm 3 B&B Method for the MIQP-OCP in (1)

Input: Upper bound UB, tolerance $\epsilon$.
1: $LB = -\infty$ and initialize $L := \{P_0\}$ with root node. ~ 1110
2: Select current node $P_c \leftarrow P_0$.
3: while $UB - LB > \epsilon$ do ~ 1111
4:    Apply domain propagation to $P_c$ using Alg. 2. ~ 1120
5:    Solve resulting QP relaxation with PRESAS. ~ 1121
6:    if QP is feasible and $J(\bar{X}, \bar{U}) \le$ UB then ~ 1125
7:      if QP solution is not integer-feasible then ~ 1135
8:        $LB \leftarrow \min_{P \in L} J(P)$. ~ 1145
9:        Select branching variable $v$ using Alg. 1.
10:       Create subproblems $P_u$ "up" and $P_l$ "down". ~ 1150
11:       Append $\{P_l, P_u\}$ to $L$ if $(1-\bar{v})\phi_v^+ < \bar{v}\phi_v^-$, or append $\{P_u, P_l\}$ to $L$, otherwise.
12:      else
13:        $UB \leftarrow J(\bar{X}, \bar{U})$ and $(X^*, U^*) \leftarrow (\bar{X}, \bar{U})$. ~ 1130
14:      end if
15:    end if
16:    Remove current node $P_c$ from to-do list in $L$. ~ 1140
17:    Select next node based on depth-first (last node in list $L$) or based on best lower bound. ~ 1115
18: end while
Output: MIQP solution vector $(X^*, U^*)$. ~ 355

Fig. 11B

ADAPTIVE OPTIMIZATION OF DECISION MAKING FOR VEHICLE CONTROL

TECHNICAL FIELD

The present disclosure relates generally to autonomous driving and advanced driver-assistance systems, and, more particularly, to determine a sequence of decisions for controlling a motion of the vehicle optimized for different traffic situations.

BACKGROUND

Conventional autonomously driving vehicles are equipped with a control system that determines how the vehicle should move on the road, accounting legal driving rules and traffic, to achieve its driving objectives. The conventional control system determines the vehicle motion by analyzing the environment based on data acquired by the sensors and processed by recognition and mapping algorithms, by computing a desired vehicle path and speed, and by controlling the vehicle to follow that path using available vehicle actuators. Due to the complexity of such conventional operations, some conventional control systems include separated components responsible for path planning and vehicle control. For instance, U.S. Pat. No. 9,915,948 discusses how the vehicle control and the path planning can be integrated to guarantee that the vehicle achieves a desired objective of the driving.

For example, the path planning of the autonomous vehicle can execute a motion planning system (MPS) responsible for determining path and/or motion trajectory of the vehicle. MPS can use different path planning methods, see for instance U.S. Pat. No. 9,568,915. To determine a motion trajectory to reach a target goal, the MPS can use knowledge of the current and predicted environment, obtained from vehicle sensors or received over communication channels as well as maps of the environment. To be able to adjust the motion trajectory according to the changing environment, the MPS needs to continuously update the motion trajectory in real-time, with limited computations due to the limited capabilities of computing and communication platforms in the vehicle.

Accordingly, due to the need to operate in real-time to account for dynamic and rapidly changing environment, the motion trajectory can be predicted only for a brief period of time, i.e., a planning interval of the MPS is not able to cover the entire driving path of the vehicle but only a certain sub-segment, from the current position to a next intermediate driving goal. In complex dynamic scenarios, such as autonomous driving in urban settings, there may be multiple sequences of intermediate goals that may all lead to a successful completion of the trip. On the other hand, some of the intermediate goals that are possibly achievable by the vehicle may fail to achieve the target driving goal, due to potential violation of the traffic rules and/or collisions with other vehicles. Hence, some intermediate goals may actually be impossible to achieve for the vehicle motion, and if provided to the MPS, the autonomous control of the vehicle would fail.

To that end, there is a need for a decision making mechanism to make a decision about a sequence of intermediate goals that motion trajectory needs to achieve in order to achieve the overall goal of driving.

SUMMARY

It is an object of some embodiments to provide a decision making system (DMS) configured to select intermediate goals to be tracked by a motion trajectory of a vehicle on its path to a target goal. Additionally or alternatively, it is an object of some embodiments to provide such a DMS that selects each intermediate goal optimally so that: (i) the goal is achievable by the vehicle, (ii) achieving the goal satisfies the traffic rules, (iii) achieving the goal does not causes negative interactions, e.g., collisions, with other vehicles, and (iv) achieving a finite sequence of intermediate goals results necessarily in achieving the target driving goal, i.e., the completion of the trip or a desired section of the trip. Additionally, or alternatively, it is an object of some embodiments to provide such a DMS for which the computation of the intermediate goals is (v) suitable to be executed in real-time by the autonomous vehicle computational unit, in order to account for the need to frequently re-compute intermediate goals according to dynamically changing environment, and (vi) safe, i.e., the simplification of the computation should not jeopardize the safety of actual control of the vehicle. However, a DMS that achieves objectives (i)-(vi) is challenging to design.

Some embodiments are based on realization that a DMS that achieves objectives (i)-(iv) can be constructed using a formal specification of the traffic rules and interactions of the vehicle and obstacles using signal temporal logic, which are combined with motion models for vehicles and obstacles. It also realized that by converting the resulting formal specifications into an optimization problem, the optimal solution of such problem provides the sequence of goals for the MPS, that are guaranteed to satisfy the objectives (i)-(iv). However, the obtained optimization problem is a nonlinear mixed integer program (NLMIP), which does not satisfy objective (v) because the solution of NLMIP in general may not be computed. In some situations, even attempting the NLMIP computation is not possible in real-time in automotive-grade computing platforms. To overcome that, in some embodiments, the motion model of the vehicle moving on a road having obstacles is approximated. In this way the optimization problem itself can be approximated as a mixed integer program (MIP) for which computation of the solution can be guaranteed, also in real-time, thus achieving the objective (v).

On the other hand, the approximation of the vehicle and traffic motion may lead to generating a sequence of intermediate goals that appear to be satisfying (i)-(iv) according to the approximated motion models, while the (i)-(iv) are not achievable according to the correct motion model, i.e., the motion model used by a motion planning system (MPS) thereby causing the MPS to fail. This is due to the solution not satisfying (vi), i.e., not being robust to modeling error. Robustifying the approximated motion model is known to be computationally expensive.

Thus, in order to achieve the objective (vi) which allows to maintain objectives (i)-(iv) in presence of approximated models needed to achieve the objective (v), some embodiments, instead of robustifying the approximated motion model, robustify the formal specifications by requesting not only that the specifications are satisfied, but that they are satisfied with a pre-described safety margin, related to the (e.g., worst case) difference between the motion model used in MPS and the approximated motion model used in DMS. In this way, satisfaction of the specifications by DMS according to the approximated motion model within the pre-described safety margin, leads to the MPS being able to satisfy the actual specifications, without such margin, according to the vehicle motion model.

Additionally, or alternatively, some embodiments are based on another realization that adding tightened specifications to ensure the satisfaction of objectives (v)-(vi) may destroy well-defined structure of the optimization problem. To that end, some embodiments lift the specifications in a higher dimension, which can be obtained by introducing additional variables and constraints in the optimization problem. As a result, the structure of the problem is retained, and structure-exploiting optimization algorithms can be applied to reduce the computation time of the solution.

Additionally, or alternatively, some embodiments are based on the realization that the DMS can use the same optimization problem to monitor the execution of the intermediate goals against unexpected events in the environment, such as newly appearing dangerous obstacles, unpredictable behavior from existing obstacles, and in the vehicle, such as failures in the vehicle control systems, etc. By modifying the environment and vehicle prediction in the optimization problem, the previously computed solution can be checked against the newly modified environment and vehicle behavior to verify if the formal specification representing (i)-(iv) is still satisfied. As the decisions are fixed, and only the vehicle and obstacle predictions are adjusted, the monitoring can be performed faster than the decision in DMS. Hence the monitoring can be executed quickly and detect problems immediately when they occur, to promptly enable reactive measure such as the recomputing of the decision by DMS or emergency actions, such as stopping, driver intervention request, or warning signaling.

Accordingly, one embodiment discloses a control system for controlling a motion of a vehicle to a target driving goal in routing selected according to a desired destination of the vehicle. The control system includes a memory configured to store a first model including one or combination of a first motion model of the vehicle and a first traffic model of motion of a traffic in proximity of the vehicle and a second model including a second motion model of the vehicle and a second traffic model of motion of the traffic, wherein the first model is an approximation of the second model; and at least one processor coupled with stored instructions implementing modules of the control system, the modules including: a decision-maker configured to determine a sequence of intermediate goals leading to the next target goal by optimizing the motion of the vehicle subject to the first model and tightened driving constraints formed by tightening driving constraints by a safety margin, wherein the driving constraints include mixed logical inequalities of temporal logic formulae specified by traffic rules and the routing, wherein the mixed logical inequalities define an area where the temporal logic formulae are satisfied, wherein the tightened driving constraints shrink the area by the safety margin, and wherein the safety margin is a function of a difference between the second model and the first model; a motion planner configured to determine a motion trajectory of the vehicle tracking the sequence of intermediate goals by optimizing the motion of the vehicle subject to the second model; and a controller configured to generate and submit control commands to at least one actuator of the vehicle to follow the motion trajectory.

Another embodiment discloses a method for controlling a motion of a vehicle to a target driving goal in routing selected according to a desired destination of the vehicle, wherein the method uses a processor coupled to a memory storing a first model including one or combination of a first motion model of the vehicle and a first traffic model of motion of a traffic in proximity of the vehicle and a second model including a second motion model of the vehicle and a second traffic model of motion of the traffic, wherein the first model is an approximation of the second model, wherein the processor is coupled with stored instructions implementing the method, wherein the instructions, when executed by the processor carry out steps of the method, including: determining a sequence of intermediate goals leading to the next target goal by optimizing the motion of the vehicle subject to the first model and tightened driving constraints formed by tightening driving constraints by a safety margin, wherein the driving constraints include mixed logical inequalities of temporal logic formulae specified by traffic rules and the routing, wherein the mixed logical inequalities define an area where the temporal logic formulae are satisfied, wherein the tightened driving constraints shrink the area by the safety margin, and wherein the safety margin is a function of a difference between the second model and the first model; determining a motion trajectory of the vehicle tracking the sequence of intermediate goals by optimizing the motion of the vehicle subject to the second model; and generating and submitting control commands to at least one actuator of the vehicle to follow the motion trajectory.

Yet another embodiment discloses a non-transitory computer readable storage medium embodied thereon a program executable by a processor for performing a method, the method including: accessing a first model including one or combination of a first motion model of the vehicle and a first traffic model of motion of a traffic in proximity of the vehicle and a second model including a second motion model of the vehicle and a second traffic model of motion of the traffic, wherein the first model is an approximation of the second model; determining a sequence of intermediate goals leading to the next target goal by optimizing the motion of the vehicle subject to the first model and tightened driving constraints formed by tightening driving constraints by a safety margin, wherein the driving constraints include mixed logical inequalities of temporal logic formulae specified by traffic rules and the routing, wherein the mixed logical inequalities define an area where the temporal logic formulae are satisfied, wherein the tightened driving constraints shrink the area by the safety margin, and wherein the safety margin is a function of a difference between the second model and the first model; determining a motion trajectory of the vehicle tracking the sequence of intermediate goals by optimizing the motion of the vehicle subject to the second model; and generating and submitting control commands to at least one actuator of the vehicle to follow the motion trajectory.

BRIEF DESCRIPTION OF THE DRAWINGS

FIG. 11A shows a block diagram and FIG. 11B shows pseudo code of an exemplar branch-and-bound optimization algorithm to solve MIP according to some embodiments.

DETAILED DESCRIPTION

Figure 1:
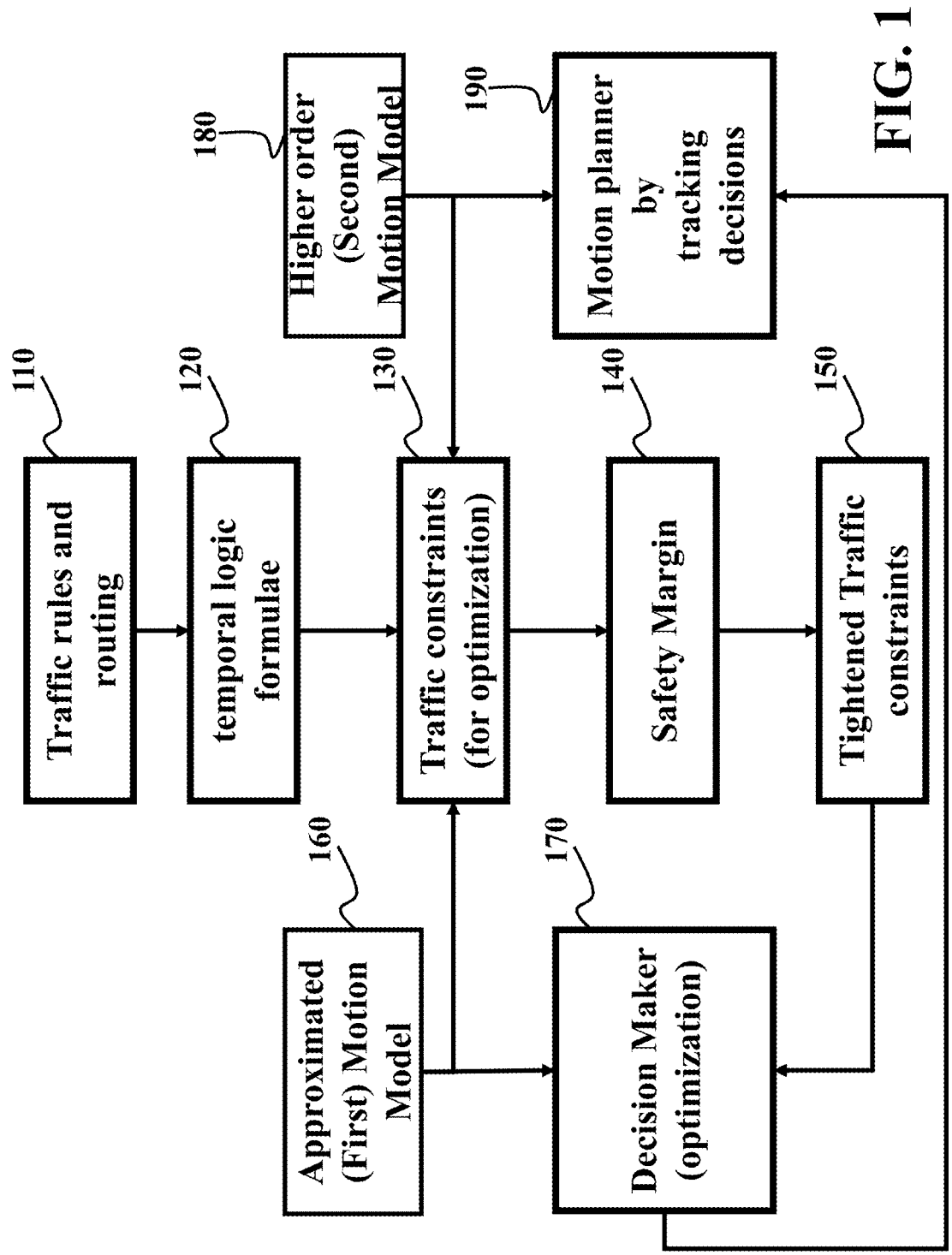
FIG. 1 shows a schematic of a method for controlling a motion of a vehicle according to some embodiments.

FIG. 1 shows a schematic of a method for controlling a motion of a vehicle according to some embodiments. The embodiments are based on recognition that optimizing the motion of the vehicle is a computationally expensive task due to high order of a motion model 180 of the vehicle, versatility of the traffic, and the necessity to generate the motion trajectory that satisfy the traffic rules 110 applicable to the routing of the vehicle. Hence, some embodiments split the process of generation of the motion trajectory into decision making 170 and motion planning 190. The objective of the decision-making is to generate a sequence of decisions, referred herein as a sequence of intermediate goals, such that if the vehicle tracks these intermediate goals, the mandate of traffic rules and routing would be satisfied and the vehicle will eventually achieve the target driving goal. Hence, the constrained optimization of the motion planner can be replaced with tracking decisions 190 produced by the decision maker 170.

Such a split allows to separate enforcement of the traffic rules from the enforcement of dynamics of the vehicle at the expense of providing a separate decision making routine. Some embodiments are based on the understanding that such a routine can be programmed to enforce the traffic rules. However, due to the variety of different traffic rules applicable in different situations, such a programming is problematic. To that end, some embodiments replace the traffic enforcement routine with optimization 170. In the optimization 170, the traffic rules and routing are enforced on the optimization routine as driving constraints. Hence, the change of the traffic rules and routing would change the constraints and not the optimization routine. In such a manner, an adaptive optimization of decision making for vehicle control in different traffic situations can be designed.

Notably, decision making generates a sequence of intermediate goals, not the motion trajectory as a function of time. So, on one hand, the computational burden on optimized decision making combined with motion tracking is still preferable over optimized motion trajectory generation. On the other hand, the computational burden of such a combination is still problematic for some embedded processors currently used in some autonomous vehicles.

To that end, some embodiments approximate 160 the motion model of the vehicle 180 used for motion planning Such an approximated motion model 160 is referred herein as a first motion model 160, while the motion model 180 used for motion planning is referred herein as a second motion model 180. Hence, the first motion model is an approximation of the second motion model, such that an order of the second motion model 180 is higher than an order of the first motion model 160 or a computational complexity of the functions of the second motion model 180 is higher than a computational complexity of the functions first motion model 160.

The approximation allows to reduce the computational burden of the decision making, however, can lead into an accuracy of tracking the decisions due to the differences in the models. To address this problem, some embodiments optimize the decision making not subject to the driving constraints 130 specified by the traffic rules 110, but subject to the tightened driving constraints 150, which are the driving constraints 130 tightened by a safety margin 140. In some embodiments, the safety margin 140 depends, i.e., is a function of a difference between the second motion model and the first motion model. For example, in one embodiment, the safety margin 140 is selected such that for all states of the vehicle satisfying the tightened driving constraints 150 there is a control input that transition the state of the vehicle according to the second motion model without violating the driving constraints 130. In such a manner, the tightened driving constraints 130 allow to balance the approximation of the motion model of the vehicle.

In addition, some embodiments are based on realization that the traffic rules can be represented by temporal logic formulae, which can be automatically transformed into driving constraints. Specifically, the temporal logic formulas can be selected from a database of signal temporal logic (STL) specifications based on a current state of the vehicle, a current state of a traffic and the next target location and automatically converted into mixed logical inequalities defining an area where the temporal logic formulae are satisfied. Having the safety margin determined to represent the difference in motion model approximation, the tightening of the driving constraints just shrinks that area by an amount related to the safety margin and the formula to which such margin is applied. In such a manner, the generating of the tightened driving constraints is simplified.

Hence, according to some embodiments, a control system for controlling a motion of a vehicle to a next target goal in routing selected according to a desired destination of the vehicle uses a first motion model 160 of the vehicle, a second motion model 180 of the vehicle, a decision-maker 170 configured to determine a sequence of intermediate goals leading to the next target goal, and a motion planner 180 configured to determine a motion trajectory of the vehicle tracking the sequence of intermediate goals.

The decision-maker 170 is configured to determine a sequence of intermediate goals leading to the next target goal by optimizing the motion of the vehicle subject to the first motion model 160 and tightened driving constraints 150 formed by tightening driving constraints by a safety margin 140. The driving constraints include mixed logical inequalities of temporal logic formulae 120 specified by traffic rules and the routing 110. The mixed logical inequalities define an area where the temporal logic formulae are satisfied, and the tightened driving constraints shrink the area by the safety margin 140, which is a function of a difference between the second motion model 180 and the first motion model 160 and the type of formulae to which the margin is applied.

The motion planner 190 is configured to determine a motion trajectory of the vehicle tracking the sequence of intermediate goals by optimizing the motion of the vehicle subject to the second motion model 180. The control system is further configured to generate and submit control commands to at least one actuator of the vehicle to follow the motion trajectory.

Figure 2A:
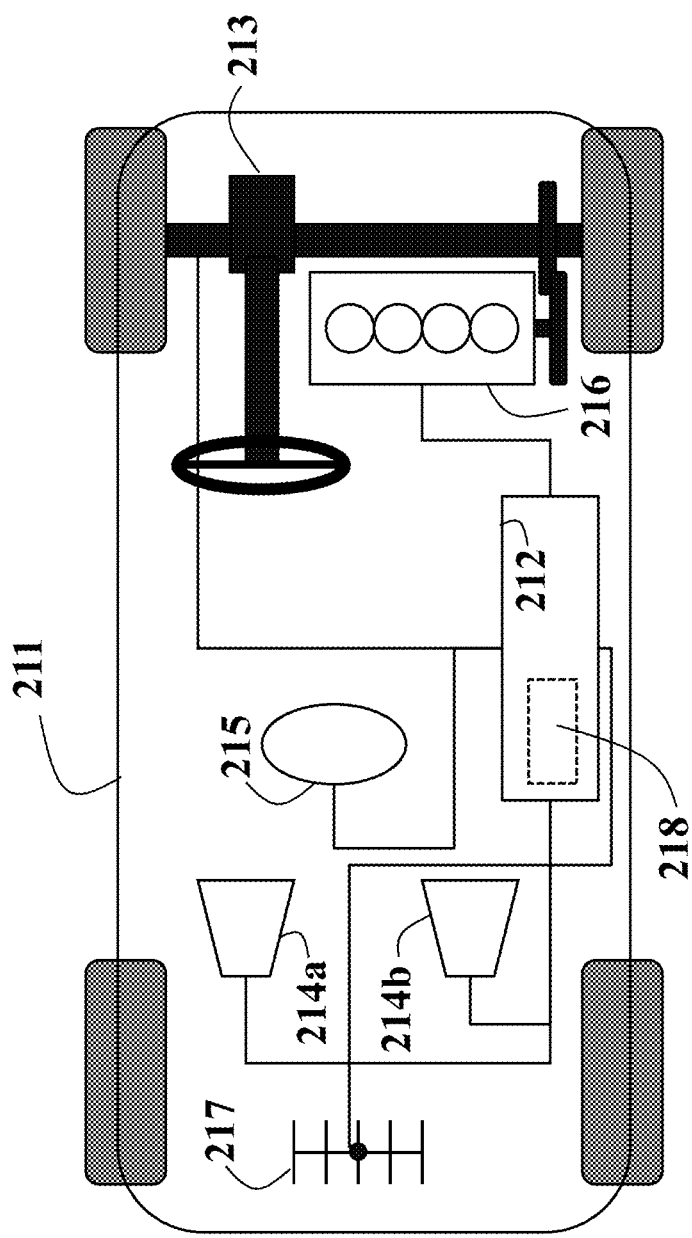
FIG. 2A is a schematic of a vehicle including a control unit employing principles of some embodiments of the present disclosure.

FIG. 2A is a schematic of a vehicle including a control unit employing principles of some embodiments of the present disclosure. For example, FIG. 2A shows a schematic of a vehicle 211 including a control unit 212 employing principles of some embodiments of the present disclosure. As used herein, the vehicle 211 can be any type of wheeled vehicle, such as a passenger car, bus, or rover. Also, the vehicle 211 can be an autonomous or semi-autonomous vehicle. For example, some embodiments control the motion of the vehicle 211. Examples of the motion include lateral motion of the vehicle controlled by a steering system 213 of the vehicle 211. The steering system 213 is controlled by the controller 212.

The vehicle can also include an engine 216, which can be controlled by the controller 212 or by other components of the vehicle 211. The vehicle 211 can also include one or more sensors 215 to sense, by non-limiting example, its current motion quantities and internal status. Examples of the sensors 215 can include global positioning system (GPS), accelerometers, inertial measurement units, gyroscopes, shaft rotational sensors, torque sensors, deflection sensors, pressure sensor, and flow sensors. The vehicle can be equipped with a transceiver 217 enabling communication capabilities of the controller 212 through wireless communication channels via an input interface 218. The vehicle can also include one or more other sensors 214a, 214b to sense the surrounding environment. Examples of the sensors 214a, 214b can include distance range finders, radars, lidars, and cameras. Alternatively, information about the surrounding environment can be received through the transceiver 217. The vehicle is equipped with map database system that stores information about the road in the area where the vehicle operates, or it can access map information stored remotely through the transceiver 217.

Figure 2B:
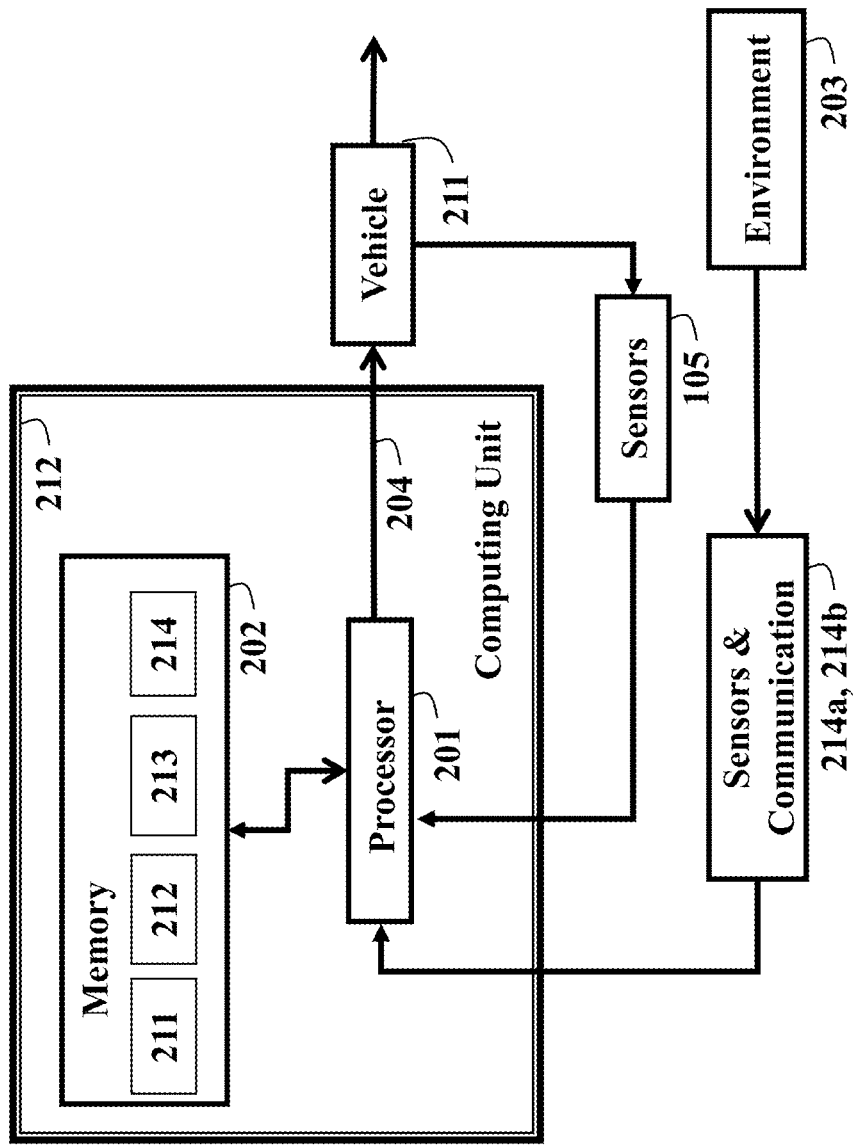
FIG. 2B is a block diagram of the control unit of FIG. 2A according to some embodiments of the present disclosure.

FIG. 2B is a block diagram of the control unit of FIG. 2A according to some embodiments of the present disclosure. For example, FIG. 2 shows a block diagram of the control unit 212 according to one embodiment of the present disclosure. The controller 212 includes a hardware processor 201 connected to a memory 202, e.g., a non-transitory computer readable medium. In some implementations, the memory 202 includes a first section 211 for storing information about the vehicle and a second section 212 for storing a program for controlling the vehicle, a third section 213 for storing driving map data, and a fourth section 214 for storing motion models of the traffic.

For example, the first section 211 of the memory 202 can store parameters for the behavior of the vehicles, such as maximum acceleration, steering, and steering rate, as well as store a first model of motion of the vehicle and a second model of the motion of the vehicle. In various embodiments, the number and complexity of equations describing the second model of motion of the vehicle is higher that the number and complexity of equations describing the first model of motion of the vehicle. Also, for example, the fourth section 214 of the memory 202 can store a first model of motion of the traffic and a second model of the motion of the traffic.

Still referring to FIG. 2B, in various embodiments, the number and complexity of equations describing the second model of motion of the traffic is higher that the number and complexity of equations describing the first model of motion of the traffic. Those embodiments are based on recognition of the necessity to use different motion models for checking what intermediate objectives the vehicle may be able to achieve in the near future, and for generating the trajectory and for controlling the vehicle according to such a trajectory. For example, in order to check if the vehicle is capable of achieving a sequence of goals, a long future horizon needs to be considered. Having a high order physical model to compute the motion of the vehicle over the extended future horizon is computationally difficult. Conversely, when the immediate goal is known, the control of the vehicle according to the desired trajectory can consider only a short future horizon. To that end, in some embodiments, the controller 212 determines the next goal using the first, i.e., low order motion model, while planning and control uses at least a second, i.e., higher order, motion model.

The second section 212 of the memory 202 can have embodied thereon a program executable by the processor 201 for performing a method for controlling the vehicle 211.

Still referring to FIG. 2B, the third section 213 of the memory 202 includes map information, such as addresses and road networks, and it may also include additional information such as intersections, stop and traffic light locations, number and position of lanes, speed limit, traffic rules, etc. The map information may be stored already in the third section of the memory 213 when the vehicle starts driving, or alternatively, this information is made available to the control unit by the communication transceiver 217 and the environment sensors 214a, 214b.

The processor 201 can be any computational device capable of performing computations, and can include one or many physical devices of the same or of different types. It is possible that the processor 201 can include multiple computational devices, e.g., microprocessors. Similarly, the memory 202 can be any logical memory and/or non-transitory computer readable storage medium capable of storing information, and can include one or more physical information storage means, of the same or of different types. The computations performed by the processor 201 are commanded by the program stored in the second section of the memory 212, and use the vehicle information stored in the first section of the memory 211, the information about the map stored in the second section of the memory 213, the information about the vehicle 211 obtained from the sensors 215, the information of the environment 203 obtained from the sensors 214a, 214b. The computation of the processor 201 results in commands 204 that change the motion of the vehicle.

Still referring to FIG. 2B, the program executed by the processor 201 enables autonomous driving (AD) of the vehicle 211, where here AD is intended to include also semi-autonomous driving. During this operation, the program executed by the processor 201 aims at achieving a specific overall objective of driving, such as reaching a specific location. The overall objective is achieved by appropriately influencing the motion of the vehicle 211. The software program executed by the processor 201 can logically be separated into multiple modules. For example, in one embodiment, the program executed by the processor includes at least two modules arranged in a sequence as layers such that output of one layer is an input to a next layer. As used herein, such layering specifies layers or logical modules of the control unit 212, and allows separating the control into different stages requiring different information.

Figure 3:
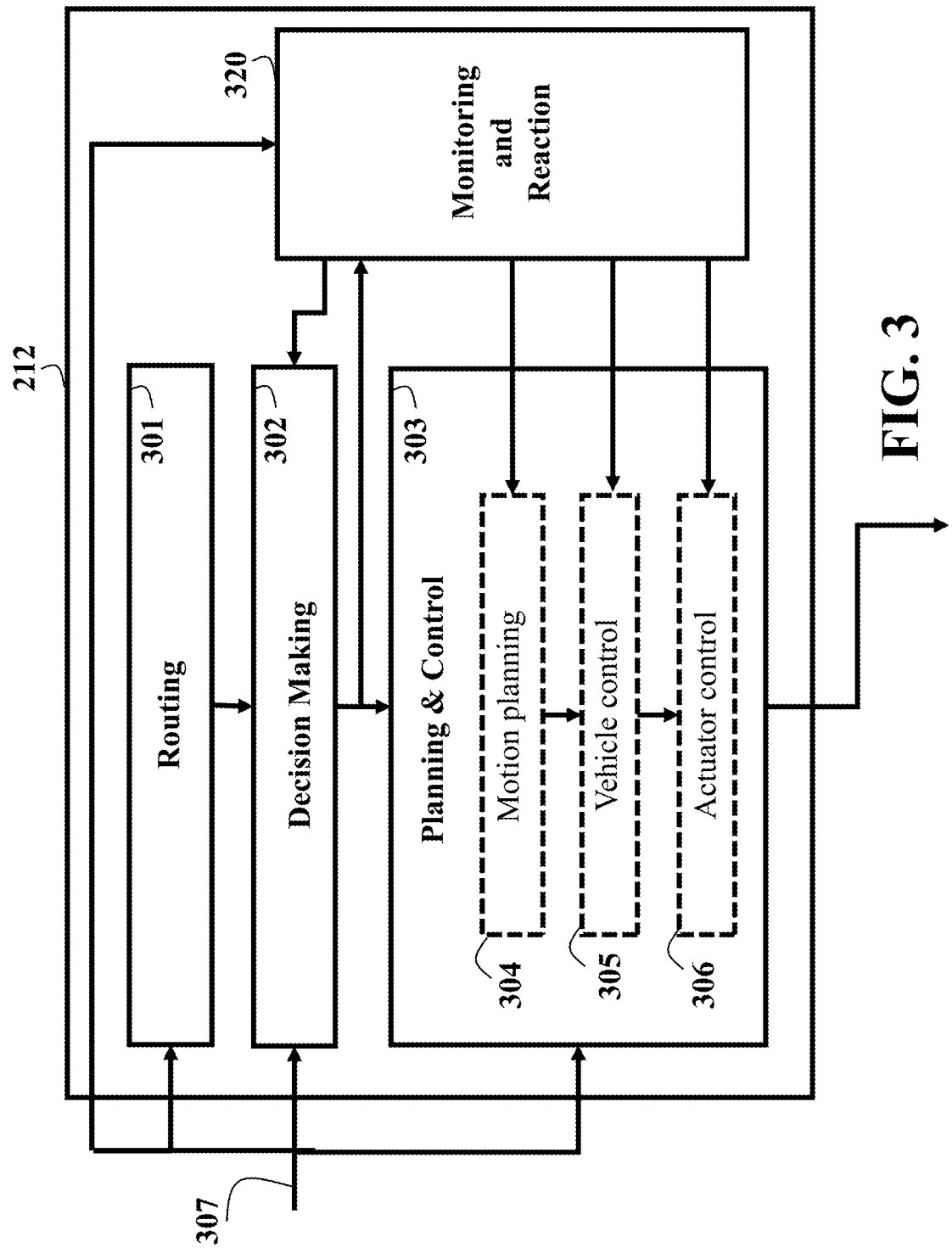
FIG. 3 is a schematic of the layers of the control unit and monitoring system according to some embodiments of the present disclosure.

FIG. 3 shows a schematic of the layers of the control unit according to one embodiment of the present disclosure. In this embodiment, the control unit 212 includes three layers of the control. The information about the state of the vehicle and of the obstacles in the dynamic environment from sensors and estimators is provided 307 to the different layers. The Routing 301 uses the static map information stored in the third section of the memory 213 of FIG. 2 and the current position of the vehicle obtained from sensors 214a, 214b to determine a sequence of roads in the road network that the vehicle traverses from its current position to reach its final destination. The final destination can be provided for instance by the user. The Routing module can be implemented by a Car Navigation system. The decision-maker or Decision Making module 302 implements the DMS that uses information from the current state of the vehicle, from at least a part of the sequence of roads in the road network that the vehicle traverses from its current position to reach its final destination, and of the dynamic environment to determines a sequence of one or more intermediate goals and provide them to the Planning and Control module 303. Upon receiving the sequence of goals, the motion-planner or motion planning module 304 which implement the MPS within the Planning and Control module 303 computes a trajectory for achieving the sequence of goals determined by the DMS. The Vehicle Control module 305 determines commands of the vehicle actuators, such as steering, acceleration, deceleration, that modify the vehicle behavior so that the vehicle achieves an actual trajectory as close as possible to the current trajectory provided by the planning and control module. The commands to the vehicle actuators are then received by the Actuator Control sub-module 306 that modifies the control signals to the actuators, such as electric motor voltage, throttle opening, brake pads pressure, to achieve the desired vehicle commands.

In parallel to the planning stack, a Monitoring and Reactive module compares the decisions that have been made by the Decision Making module with the information on the state of the vehicle and of the obstacles in the dynamic environment from sensors and estimators 307, to ensure correct operation of the vehicle according to the determined sequence of one or more intermediate goals provided to the Planning and Control module 303, and if anomalies or potential errors are detected, provides information to the Decision Making module and the submodules on the Planning and Control module on the anomaly and indications on corrective actions.

Figure 4:
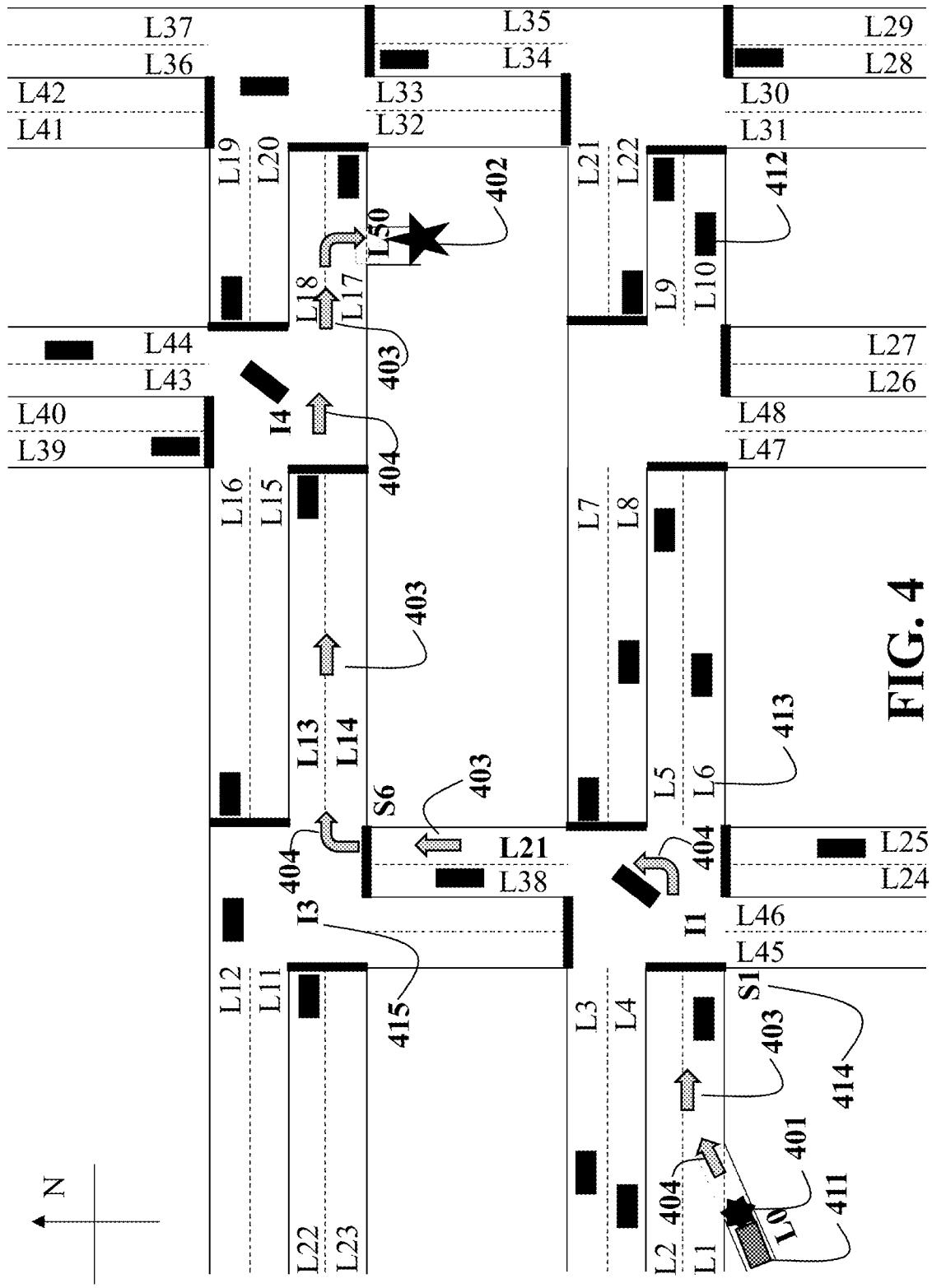
FIG. 4 illustrates a description of the routing information as used in some embodiments of the present disclosure in an exemplary traffic scene.

FIG. 4 illustrates a description of the routing information as used in some embodiments of the present disclosure in an exemplary traffic scene. For example, FIG. 4 depicts a scenario with the vehicle under control, referred to as ego vehicle 411, with the traffic composed of other vehicles shown similar to 412, lanes marked for instance 413 as L6, stop lines marked for instance 414 as S1, intersections marked for instance 415 as I3. With reference to FIG. 4, for the vehicle in position 401, with final destination 402, the Routing 301 provides the sequence of roads indicated by arrows 403, and the sequence of turns indicated by arrows 404. It should be noted however that the sequence of roads 403 and the sequence of turns 404 does not by itself specify a trajectory or a path for the vehicle. There are a number of discrete decisions to take such as in what lane the vehicle is to drive, if the vehicle should change lane or stay in the current lane, if the vehicle should start decelerating to stop at the stop line or not, if the vehicle is allowed to cross the intersection, and so on. Furthermore, there are a number of continuous decisions to make, such as the timed sequence of positions and orientations that the vehicle should achieve on the travel from its initial point to its destination. These decisions cannot be taken by the Routing 301 because they depend on the current traffic at the moment when the vehicle reaches the corresponding location, which is in general unknown to the Routing due to the uncertainty of traffic motion and uncertainty of the moment at which the vehicle will reach the location.

The actual trajectory, in terms of sequence of positions and orientations and corresponding time instant, that the vehicle should execute to get to the final destination is usually determined by a planning and control module 303. However, the planning and control 303 of FIG. 3 may not be able to operate based directly on the information provided by Routing 301. In particular, operating discrete and continuous decision in a single step leads to a so-called hybrid decision problem, that is a problem with both discrete decisions (in which lane to drive, whether to pass or follow a vehicle, etc.) and continuous decisions (the ego vehicle velocity, the steering angle, etc), which based on experimentation and computing theory results requires a very large amount of computations. Instead, the computing unit 212 has often limited memory and processing speed, and hence it is beneficial to decompose the problem in a way that makes it computationally tractable, yet it ensures that no inconsistencies are caused by the decomposition. That is, decomposing the overall problem into many simpler sub-problems, solving each single subproblem in sequence, and operating according to the sequential solution of the sub-problems, results in a solution to the overall problem.

Still referring to FIG. 4, another realization of the present disclosure is that one can decompose the problem in terms of discrete decisions and continuous decisions where a decision-making module 302 of FIG. 3 operates discrete decisions, such as whether to change lane or stay in the current lane, whether to start decelerating to stop at the stop line or not, whether to cross the intersection or not, and converts this into intermediate goals for the Planning and Control module 303 of FIG. 3. The Planning and Control module 303 receives the current intermediate goal and possibly additional parameters for adjusting its computation to the current intermediate goal from the decision-making module 302, and performs its computation. The planning and control module may inform the decision-making module of the achievement of the current intermediate goal, or the impossibility of achieving the current intermediate goal. The goals provided by the decision-making module 302 should be achievable by the Planning and Control module, according to the current traffic conditions and vehicle conditions, should ensure that the sequence of intermediate goals allows to be interconnected, i.e., the planner can switch from one goal to the next one, and achieving all intermediate goals results in achieving the overall goal, i.e., reaching the final position.

Thus, the decision-making module 302 of FIG. 3 processes the information from Routing 301 using the map stored in the third section of the memory 213 of FIG. 2 to produce a sequence of goals, and, using information from sensors and communication 214a, 214b selects one or more alternative current goals to provide to the Planning and Control module 303 of FIG. 3, which uses those goals to determine and execute the current trajectory.

Still referring to FIG. 4, it is further realization of this present disclosure that some intermediate goals are specific and some other goals are optional. The road segments indicated by Routing 301 of FIG. 3 determines specific goals, such as specific turns at intersections. However, there are additional specific goals due to the proper operation of the vehicle according to driving rules. For instance, staying stopped at a stop line, and also decelerating to stop at a stop line, is specific according to driving rules. Similarly, to stay on a specific lane at a specific intersection based on the turn to be taken at such intersection may be mandatory. The same can be said as regards being on a specific lane before exiting the general road.

Figure 5:
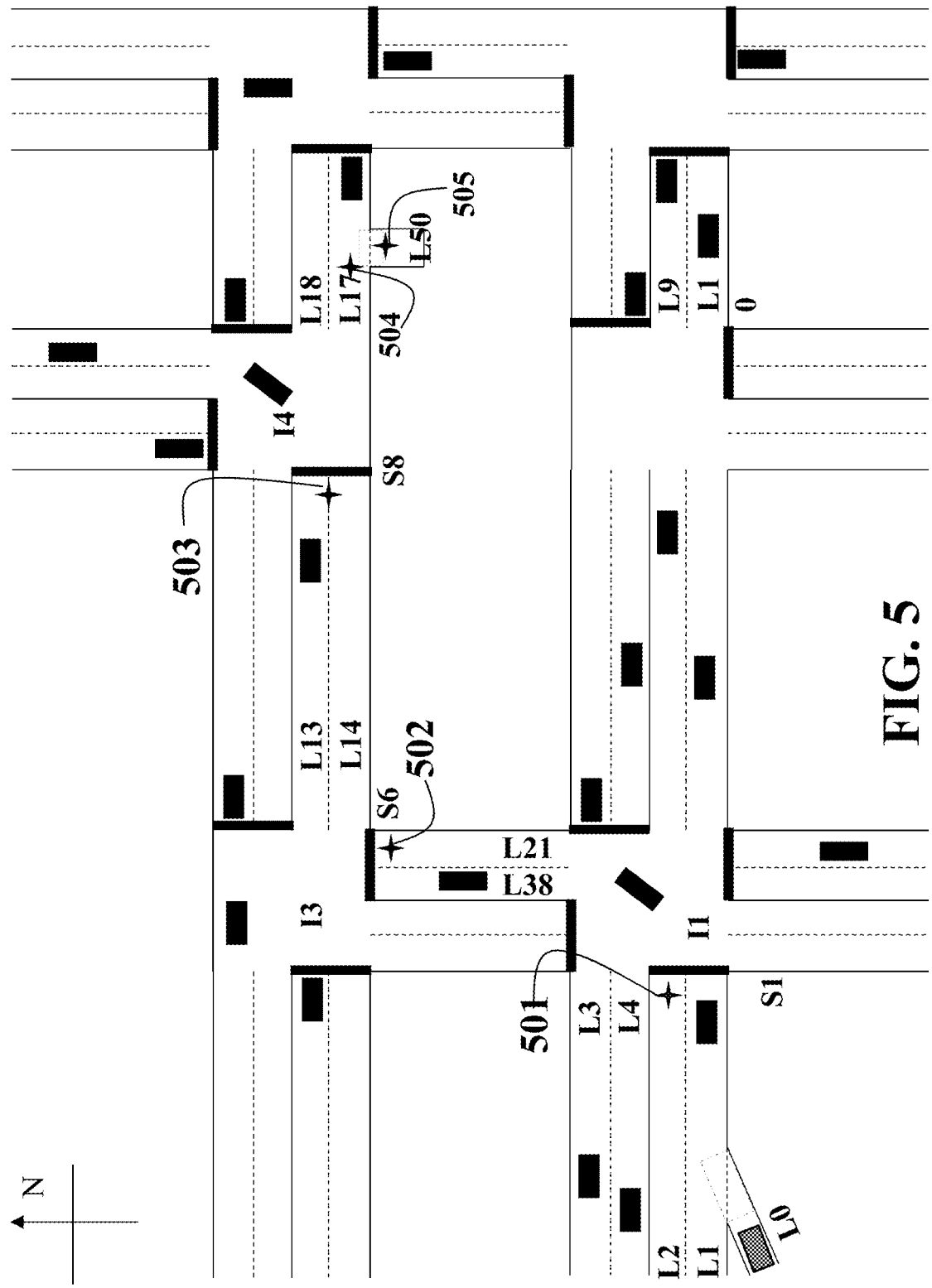
FIG. 5 illustrates a description of the specific intermediate goals as used in some embodiments of the present disclosure in the exemplary traffic scene in FIG. 4.

FIG. 5 illustrates a description of the specific intermediate goals as used in some embodiments of the present disclosure in the exemplary traffic scene in FIG. 4. For example, in FIG. 5, this results in specific intermediate goals 501, 502, 503, which are related to being stopped at a stop line. While specific intermediate goals 501 and 502 require a specific lane, intermediate goal 503 does not. Specific intermediate goal 504 is related to being in a specific lane before exiting the general road, and specific intermediate goal 505 coincides with the final destination, i.e., the final goal.

Figure 6:
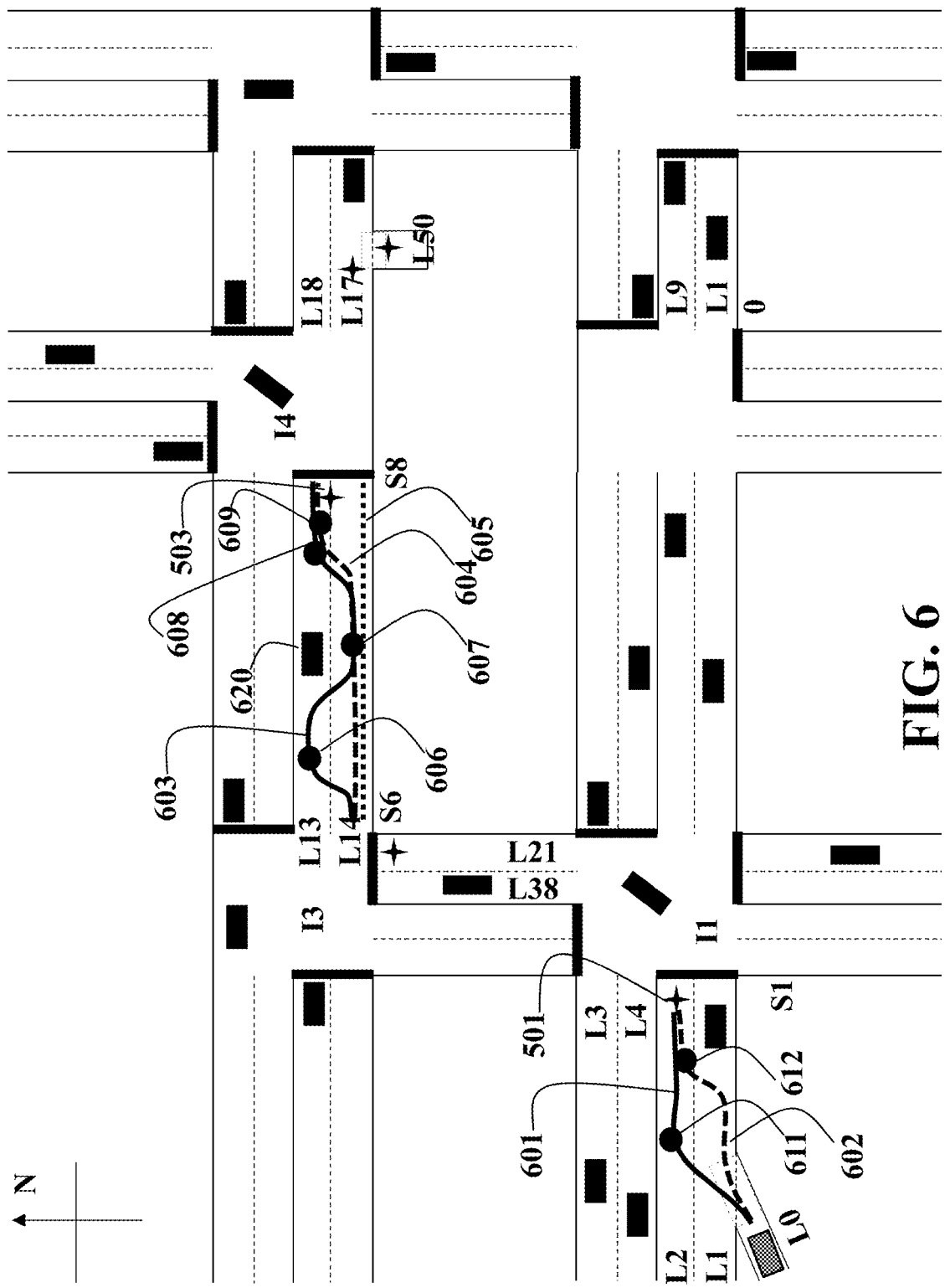
FIG. 6 illustrates a description of the optional goals as used in some embodiments of the present disclosure in the exemplary traffic scene in FIG. 4.

FIG. 6 illustrates a description of the optional intermediate goals as used in some embodiments of the present disclosure in the exemplary traffic scene in FIG. 4. Besides specific intermediate goals, there are a number of intermediate goals that are optional. For instance, in FIG. 6 trajectories 603 and 604 both reach the specific intermediate goal 503, yet trajectory 603 has intermediate goals 606 and 607 that prompt 2 lane changes, while trajectory 604 does not. Both trajectories 603, 604 have intermediate goals 608, 609 of changing lane before the stopline, which is also not required since both lanes are allowed to proceed forward at intersection I4. In fact, trajectory 605 has no intermediate goals and directly reaches the specific goal 503. Also, besides the sequence of intermediate goals, the timing of those can be different, as trajectories 601,602 both have intermediate goals 611, 612 of a lane change to L2, which is necessary due to the specific intermediate goal of stopping in lane L2 at stop line S1 to turn left at intersection I1, yet the location where the intermediate goals 611, 612 are applied are significantly different.

Some embodiments are based on the understanding that the selection of the intermediate goals can be performed based on graph searching techniques. For example, to address the connection between Routing module and path planning module by a DMS it is possible to construct a graph of intermediate goals from the Routing module information and from the traffic rules information and then uses vehicle and obstacle information together with the graph to determine at each instant the next intermediate goal that is achievable by the vehicle without causing collision with traffic or violating traffic rules, and from which the vehicle is still guaranteed to be able to achieve the final goal. However, the design of the graph is particularly complicated because it requires the translation of natural language descriptions into graph states and connections, for instance of the traffic rules.

To that end, some embodiments are based on the realization that rather than converting the traffic rules and the routing information into a graph of intermediate goals, one can instead describe such information in terms of a temporal logic-based formal specification language, such as linear temporal logic (LTL) or signal temporal logic (STL), from which the graph of intermediate goals is automatically generated, with the advantage of an easier conversion from natural language to formal specification language.

Signal Temporal Logic (STL) Specifications

In signal temporal logic, regions of physical states of the vehicles and of the traffic models are associated to predicates $\Pi = \{\pi^{\mu_1}, \pi^{\mu_2}, \ldots\}$ by functions $\mu_i: \mathbb{X} \to \mathbb{R}$ where $\mathbb{X}$ is the set of vehicle and traffic states. An STL formula $\phi$ is defined recursively by $$\phi := \pi^\mu \mid \neg \phi \mid \phi_1 \wedge \phi_2 \mid \phi_1 \mathcal{U}_I \phi_2 \quad (1)$$

where $\phi_1$, $\phi_2$, are also STL formulae defined according to (1), $\neg$, $\wedge$, $\mathcal{U}$ represent the logical operators "not", "and", and the temporal operator "until", respectively. Temporal operator "until" is equipped with an interval I, indicating the time window in which the STL formula is evaluated. A number of additional operators can be derived from the ones in (1) such as logical "or" $\phi_1 \vee \phi_2 \doteq \neg(\neg \phi_1 \wedge \neg \phi_2)$, temporal "eventually" $\Diamond_I \phi_1 \doteq \top \mathcal{U}_I \phi_1$, and temporal "always" $\Box \phi \doteq \neg(\Diamond \neg \phi)$, where eventually indicates that sooner or later the argument is true, always indicates that the argument is always true, and $\top$ denotes a predicate that is always true, and "next" $\bigcirc \phi \doteq (\top \mathcal{U}_{[1,1]} \phi)$.

We say that an STL formula $\phi$ is satisfied by a trajectory $\xi = \{x_0, x_1, \ldots\}$ of combined vehicle and traffic states at time step t, denoted as $\xi, t \models \phi$ according to the following rules $\xi, t \models \top$, $\xi, t \models \pi^\mu$ if and only if $\mu(x_t) > 0$, $\xi, t \models \neg \phi$ if and only if $\xi, t \not\models \phi$, $\xi, t \models \phi_1 \wedge \phi_2$ if and only if $\xi, t \models \phi_1$ and $\xi, t \models \phi_2$, $\xi, t \models \phi_1 \mathcal{U}_{[a,b]} \phi_2$ if and only if there exists $t_2 \in [t+a, t+b]$ such that $\xi, t_2 \models \phi_2, \xi, t_1 \models \phi_1$ for $t_1 \in [t, t_2]$. (2)

where similar definitions can be obtained for derived operators, such as "or", "eventually", "always". A quantitative scoring of the STL formula satisfaction can be obtained by introducing a measure for the formula satisfaction $\rho(\phi, \xi, t)$ called robustness score and computed as $\rho(\mu, \xi, t) = \mu(x(t))$, $\rho(\neg \phi, \xi, t) = -\rho(\phi, \xi, t)$, $\rho(\phi_1 \wedge \phi_2, \xi, t) = \text{Mill}(\rho(\phi_1, \xi, t), \rho(\phi_2, \xi, t))$, $\rho(\phi_1 \mathcal{U}_I \phi_2, \xi, t) = \max_{t_2 - t \in I} \min(\rho(\phi_2, \xi, t_2), \min_{t_1 \in [t, t_2]} \rho(\phi_1, \xi, t_1))$. (3)

where the formula is satisfied when $\rho(\phi, \xi, \tau) > 0$. The sign of the robustness score indicates if the specifications are satisfied or violated, whereas the absolute value indicates quantitively how much that happened.

Some embodiments formulate traffic rules by STL formulae. Consider, for instance, the following list of formulas in_lane $\vee$ (lane_changing $\mathcal{U}_{[1.5,4.5]}$ in_lane)

$\Box$ safety_distance_ahead $(\neg \text{intersection}) \vee (\text{intersection}$
  $\wedge ((\text{red\_light} \vee \text{vehicle\_stop}) \mathcal{U} (\neg \text{red\_light}$
  $\wedge \text{crossing})))$ $\neg(\text{red\_light} \wedge \bigcirc \neg \text{red\_light}) \vee$
  $((\text{red\_light} \wedge \bigcirc \neg \text{red\_light}) \wedge \Diamond_{[0,3]} \text{crossing})$ (4)

The first formula specifies proper operation of the vehicle in the lane, namely, that either the vehicle is in the lane, or it is lane changing until it goes back into the lane within 1.5 s and 4.5 s from the beginning of the lane change. The second formula specifies to always maintain a safety distance from the preceding vehicle. The third formula specifies behavior in the intersection, where in presence of a red light, the vehicle must stop until the light is no longer red and the vehicle starts moving again. The fourth formula specifies that when the light turns from red to green, the vehicle must start crossing the intersection within 1 to 3 seconds.

Similarly, the specific intermediate goals and the final goal from the routing module can be specified by STL rules, such as $$\Diamond_{[t_i, t_{i+1}]} \text{achieve\_int\_goal}_p i = 1, \ldots, n_g \quad (5)$$

where $n_g$ is the number of specific intermediate mandatory goals from the routing module and $t_i < t_{i+1}$, that specifies that every specific intermediate goal must be satisfied in finite time, each after the previous one, and such as $$\text{achieve\_goal}_3 \wedge \bigcirc(\text{crossing } \mathcal{U}_{[1,10]} \text{ turn\_left}) \quad (6)$$

that specifies that after achieving goal number 3, the vehicle crosses an intersection and makes a left turn, within 1 to 10 seconds. The specification of achieving the final goal, i.e., the completion of the trip, can be formulated as $$\Diamond_{[0, T_{max}]} \text{achieve\_final\_goal} \quad (7)$$

where $T_{max}$ indicates the maximum travel time.

Thus, the traffic rules and specific intermediate goals can be specified by the set of STL formulae $$\{\phi^i\}_{i=1}^{n_\phi} \quad (8)$$

The predicates are connected to vehicle and traffic states, containing at least positions and velocities of the vehicle and the traffic, by inequalities describing the region of the combined state space where the predicates are true. For instance, $$(\text{achieve\_final\_goal} = T) \Leftrightarrow \left( H_g \begin{bmatrix} p_x^v \\ p_y^v \end{bmatrix} \leq K_g, v_v \leq 5 \right) \quad (9)$$

indicates that the predicate describing acceptance of the final goal is true if and only if the vehicle velocity is below 5 km/h and the position of the vehicle satisfies the linear inequalities describing the location of the trip destination. Also, the function μ determines the margin of satisfaction of the predicate at time t for trajectory ξ also called robustness score, by $$\mu(\text{achieve\_final\_goal}, \xi, t) = \min \left( K_g - H_g \begin{bmatrix} p_x^v(t) \\ p_y^v(t) \end{bmatrix}_i, 5 - v_v(t) \right) \quad (10)$$

The robustness score of complex formulae can be computed from those of predicates by operations such as $$\rho(\mu, \xi, t) = \mu(x(t)),$$
$$\rho(\neg \phi, \xi, t) = -\rho(\phi, \xi, t),$$
$$\rho(\phi_1 \wedge \phi_2, \xi, t) = \min(\rho(\phi_1, \xi, t), \rho(\phi_2, \xi, t)),$$
$$\rho(\phi_1 \mathcal{U}_I \phi_2, \xi, t) = \max_{t_2 - t \in I} \min(\rho(\phi_2, \xi, t_2), \min_{t_1 \in [t, t_2]} \rho(\phi_1, \xi, t_1)). \quad (11)$$

The robustness scores determine how much the actual behavior can be different from the expected behavior without changing the validity of the formulae.

Mixed Integer Constraints

For executing computations in real-time with a dynamic environment the STL specifications can be converted into mixed logical inequalities by introducing Boolean variables. For instance, it is possible to introduce one Boolean variable per each predicate defined by the mixed integer inequalities $$M z(t)^\mu > \mu(\pi^\mu, \xi, t)$$

$$M(1 - z(t)^\mu) > -\mu(\pi^\mu, \xi, t) \quad (12)$$

which ensures that $z(t) = 1$ if and only if $\mu(\pi^\mu, \xi, \tau) > 0$. Then, the STL formulas can be translated into logical constraints on the Boolean variables z. For instance, $$z_2 = \neg z_1 \leftrightarrow z_2 = 1 - z_1$$
$$z_3 = z_1 \wedge z_2 \leftrightarrow z_3 \leq z_1, z_3 \leq z_2, z_3 \geq z_1 + z_2 - 1$$
$$z_3 = z_1 \vee z_2 \leftrightarrow z_3 \geq z_1, z_3 \geq z_2, z_3 \leq z_1 + z_2 \quad (13)$$

and the temporal operators can be translated into integer constraints on sequences of variables z over time. For instance $$\Box_{[a,b]} \phi_t \leftrightarrow \bigwedge_{t=a}^{b} z^\phi(t) \quad (14)$$

$$\Diamond_{[a,b]} \phi_t \leftrightarrow \bigvee_{t=a}^{b} z^\phi(t)$$

It is important to notice that while the translation of logical operator in (13) involves variables all associated to the same time instant, the translation of temporal operators in (14) in general involves variables associated to different time instants.

As a consequence, the STL formulae in (9) specifying the traffic rules and goals for the vehicle can be converted into a set of mixed integer inequalities between a sequence of vehicle and traffic states over time and the vector of the introduced Boolean variables z $$\rho(\phi^i, \xi, t) = \rho^i \leq \sum_{t=0} H_b^i z(t) + H_r^i x(t), i \in \mathcal{I}_h \subseteq \{1, \ldots, n_\phi\} \quad (15a)$$

$$\rho(\phi, \xi, t) = \rho \leq \rho(\phi^i, \xi, t) i \in \mathcal{I}_h$$

$$\rho(\phi, \xi, t) = \rho \geq \varepsilon > 0 \quad (15b)$$

where ε is an infinitesimally small positive constant, e.g., in the range of the processor precision and N is the prediction horizon upon which the formulae is evaluated and ρ is computed as the overall robustness score for the satisfaction of the formulae from (11).

As a consequence, one embodiment can include constraints on the overall robustness score ρ to ensure that the overall behavior admits a certain amount of difference between the actual and expected behavior $$\rho \geq R \geq \varepsilon > 0 \quad (15c)$$

Vehicle Motion Model for DMS and MPS

In some embodiments, in order to keep the computation feasible in real-time, different models of vehicle motion are used in the DMS and MPS. The DMS performs decisions based on predictions of vehicle motion for longer in the future, but more coarsely. The MPS plans the vehicle motion for shorter period in the future, but more finely, since it requires higher precision so that the planned vehicle motion can be executed by the vehicle. Thus, some embodiments use a first vehicle model in DMS and a second vehicle model in MPS. However, it is important to ensure consistency of the predictions of the two models, and in particular that if the DMS finds a solution to the decision making problem that satisfies the problem objectives according to the first (coarse) model of vehicle motion, it is guaranteed that a solution for the planning problem of MPS exists, according to the second (fine) model of vehicle motion to find a solution In some embodiments, the first model of vehicle motion, $$x_1(t+1)=f_1(x_1(t)_1,u_1(t)) \quad (16)$$

is used in Decision Making 303 for coarse predictions to select which specific intermediate goals can be achieved by the vehicle. In various implementations, this model is coarser, lower complexity and/or has fewer parameters than the second model of the vehicle motion, because it needs to predict longer in the future and hence it is necessary that it makes fewer calculations for each prediction.

For instance, some embodiments of this present disclosure use as first model of the vehicle motion (16) a discrete time linear model with sampling period $T_s$, which has state $x_1=(p_x, p_y, v_x)$, where $(p_x, p_y)$ is the position vector with respect to a non-moving Cartesian coordinate frame, and $v_x$ is the vehicle longitudinal speed, and has input $u_1=(a, v_y)$ where a is the acceleration and $v_y$ is the lateral velocity, $$p_x(t+1)=p_x(t)+v_x(t)T_s$$

$$p_y(t+1)=p_y(t)+v_y(t)T_s$$

$$v_x(t+1)=v_x(t)+a_x(t)T_s \quad (17)$$

To which one can add the constraint $v_y(t) \leq \alpha |v_x(t)|$ to ensure appropriate relation between vehicle longitudinal and lateral motion.

In some embodiments, the second model of vehicle motion $$x_2(t+1)=f_2(x_2(t),u_2(t)) \quad (18)$$

is used in the Motion Planning module 304 to compute the vehicle trajectory that actually achieves the goal determined by Decision Making 303. Since the trajectory computed by the Motion Planning module 304 is actually executed by the vehicle in order to achieve the goal, the model of vehicle motion used by the motion planning module 304 needs to be more precise, and hence has at least one among higher order, more parameters and more complicated equations. However, since the prediction of the Motion Planning module 304 is usually shorter than the one of the decision making, the higher order model is still feasible in terms of computations required.

For instance, some embodiments of this present disclosure use as second model of the vehicle motion (4) the kinematic bicycle model which has state $x_2=(p_x, p_y, v_x, \theta, \delta)$, where $(p_x, p_y)$ is the position vector with respect to a non-moving Cartesian coordinate frame, and $v_x$ is the vehicle longitudinal speed, $v_y$ is the lateral velocity, $\theta$ is the heading, and B is the steering angle, input $u_2=(u_a, u_\delta)$ where $u_a$ is the acceleration and $u_\delta$ is the change in steering angle, $$p_x(t+1) = p_x(t) + T_s^{(2)} v_x(t) \frac{\cos(\psi(t) + \beta(t))}{\cos(\beta(t))} \quad (19)$$

$$p_y(t+1) = p_y(t) + T_s^{(2)} v_x \frac{\sin(\psi(t) + \beta(t))}{\cos(\beta(t))}$$

$$\theta(t+1) = \theta(t) + T_s^{(2)} v_x(t) \frac{\tan(\delta(t))}{L}$$

$$v_x(t+1) = v_x(t) + T_s^{(2)} u_a$$

$$\delta(t+1) = \delta(t) + T_s^{(2)} u_\delta$$

where L is the wheel base, $L=l_f+l_r$, $l_f$ and $l_r$ are the front and rear axles distances from the vehicle center of mass, $\beta=\arctan(l_r \tan(\delta)/L)$ is the body-slip angle, and $T_s^{(2)}$ is the sampling period of the second model of the vehicle motion where in general $T_s^{(2)} \leq T_s$.

Constraints on Inputs of Models of Vehicle Motion

Some embodiments, for computing the vehicle trajectories account for constraints on the states and inputs of the vehicle models. Such constraints are determined by the allowed range of actuators, such as minimum and maximum steering angle, angular rate, acceleration and braking, legal and safety requirements, such as minimum and maximum velocity. The constraints result in bounds to the state and input vectors for the first motion model $$(x_v, u_v) \in \mathcal{F}_v \quad (20)$$

which for instance include the constraint $v_y(t) \leq \alpha |v_x(t)|$ that ensure a proper relation between longitudinal and lateral velocity, and for the second motion model $$(x_1, u_1) \in \mathcal{F}_1 \quad (21)$$

Which should be satisfied by the decision and planning algorithms operating on the models.

Difference Between First and Second Motion Models

Some embodiments compute an envelope to ensure the consistency of the first and second motion models, that is, to ensure that once a trajectory of the state of the first model of vehicle motion (16) that satisfies the constraints (20) is found for achieving a goal, there exists a trajectory of the state of the second model of vehicle motion (18) that satisfies the constraints (21) is found that achieves the same goal.

To this end the DMS is provided with a set W, such that for all states of the second model of the vehicle motion $x_2$ that satisfies (21) for some input $u_2$, and for all $x_1=P(x_2)$, $u_1$ satisfying (20) where P is a pre-defined transformation that associates a state of the first model of the vehicle motion that satisfies to a state of the second model, there exists an input $u_2$ that satisfy (21) together with $x_2$, such that $$(f_1(P(x_2)+w, u_1)-P(f_2(x_2, u_2))) \in W, \forall w \in W \quad (22)$$

that is, the difference between the update according to the first model with input $u_1$ of the transformation of the state of the second model plus any disturbance in W, and the projection of the update according to the function of the second model with input $u_2$ of the state of the second model is within W. In such a manner, wherein the safety margin is selected such that for all states of the vehicle satisfying the tightened driving constraints according to the first motion model of the vehicle, there is a control input that transition the state of the vehicle according to the second motion model without violating the driving constraints An example for P is the projection operator on a specific subspace of the space of $x_2$. According to (22) it is always possible to maintain the difference between prediction with high precision model and that with low precision model within the error set W. In some embodiments, the set W is function of the state of the first model of motion of the vehicle, $W(x_1)$.

Traffic Models

In some embodiments of the present disclosure, DMS 302 and Planning and Control 303 use a first model of traffic motion and a second model of traffic motion stored in the first section 211 of the memory 202 to predict the future behavior of other vehicles present in the road, where the first model of the traffic motion is simpler to evaluate, in terms of computations, than the second model of the traffic motion.

The state of a traffic according to the first and second model of traffic motion $x_{t1}$, $x_{t2}$ is obtained by combining the states of all traffic vehicles on the road in the area where the vehicle under control is currently located $$x_{ti}=(x_{ti}^{(1)}, \ldots, x_{ti}^{(NT)}), i=1,2 \quad (23)$$

where, for instance, $x_{t1}^{(1)}$ is the state of the first traffic vehicle according to the first model of the traffic motion, and $N_T$ is the number of total vehicles in traffic. The first model of the traffic motion describes the motion of each vehicle in traffic according to a first equation $$x_{t1}^{(i)}(t+1) = f_{t1}(x_{t1}^{(i)}(t)) \quad (24)$$

The second model of the traffic motion describes the motion of each vehicle in traffic according to a second equation $$x_{t2}^{(i)}(t+1) = f_{t2}(x_{t2}^{(i)}(t)) \quad (25)$$

In some embodiments of the present inventions, a set $W_t$ is chosen to satisfy $$(f_{t1}(P(x_{t1})+w) - P(f_{t2}(x_{t2}))) \in W_t, \forall W \in W_t \quad (26)$$

ensuring a proper margin between traffic motion predicted with first and second model.

The control unit 212 receives information about the traffic state from sensors and communication 214a, 214b. The equations (10), (11) can be specified by any standard vehicle model such as the unicycle model (2) or the kinematic bicycle model (4).

Motion Model Formulation as Constraints

Some embodiments are based on realization that if discrete-time linear models such as (17) are used as motion model for vehicle and traffic, and if the feasible set of the constraints (20), (21) are polyhedral, the motion model and the constraints can be formulated as block-structured linear constraints $$x_1(t+1) - A_1 x_1(t) = B_1 u_1(t) \quad (27)$$
$$x_{t1}^{(i)}(t+1) - A_{t1}^{(i)} x_{t1}^{(i)}(t) = 0, \forall i = 1, \ldots N_T$$
$$H_x x_1(t) + H_v u_1(t) + \sum_{i=1}^{N_T} H_{t1}^{(i)} x_{t1}^i(t) \leq K$$

where each inequality involves variables from the same sampling instants or maximum from two consecutive sampling instants.

Indeed, the inequalities in (27) may be compressed by removing implicitly defined variables and equality constraints resulting in a single set of constraints dependent only on the initial state of vehicle and traffic, and on the inputs to the vehicle $$\sum_{t=0}^{N} H_u^c u_1(t) \leq K + H_x^c x_1(0) + \sum_{i=1}^{N_T} H_{t1}^{i,c} x_{t1}^i(0) \quad (28)$$

Decision Making with STL Specification as MIP Problem

In some embodiments, the DMS is implemented by solving a mixed integer programming (MIP) problem by combining the mixed integer constraint formulation of the STL specifications of traffic rules and driving goals (15), the first motion model for vehicle and traffic expressed as linear constraints (27), constraints that relates to the robustness score of the STL specification satisfaction and a cost function involving the robustness score and the performance of the vehicle motion according to the first vehicle motion model, $$\min_{\{(x(t), u_1(t), z(t))\}_t, \rho, \{\rho^j\}_j} J_p(\{(x(t), u(t))\}_t) + J_r(\rho) \quad (29)$$

$$x_1(t+1) - A_1 x_1(t) = B_1 u_1(t)$$
$$x_{t1}^{(i)}(t+1) - A_{t1}^{(i)} x_{t1}^{(i)}(t) = 0, \forall i = 1, \ldots N_T$$
$$H_x x_1(t) + H_v u_1(t) + \sum_{i=1}^{N_T} H_{t1}^{(i)} x_{t1}^j(t) \leq K$$
$$\rho^j \leq \sum_{t=0}^{N} H_b^j z(t) + H_r^j x(t), \quad j \in \mathcal{J}_h \subseteq \{1, \ldots, n_\phi\}$$
$$\rho \leq \rho^j, \quad j \in \mathcal{I}_h$$
$$\rho \geq R \geq \varepsilon > 0$$
$$t = 0, \ldots, N$$
$$z(t) \in \{0, 1\}^{n_z}$$

where N is the horizon of decision in DMS, x contains the states of the vehicle and the traffic, $\mu_1$ is the vehicle input according to the first model, $J_p$ is the performance cost, such as the linear-quadratic cost $$J_p = \sum_{t=0}^{N} x(t)' Q x(t) + u_1(t)' \Theta u_1(t) \quad (30)$$

where Q, Θ are positive semidefinite matrix weights, $J_r$ is the robustness cost, such as $$J_r = \rho' P \rho \quad (31)$$

where P is a positive definite matrix weight and R is the requested positive robustness score for the satisfaction of the STL specifications. It is noted that (29) maintains a block sparsity structure of the constraints except for the constraints due to STL formulation of the route and goal specifications in (15).

By considering the compressed form (28) for the model of vehicle and traffic, and applying a similar construction we obtain the mixed integer programming problem $$\min_{\{u_1(t), z(t)\}_t, \rho, \{\rho^j\}_j} J_p(\{u(t)\}_t) + J_r(\rho) \quad (32)$$

$$\sum_{t=0}^{N} H_u^c u_1(t) \leq K + H_x^c x_1(0) + \sum_{i=1}^{N_T} H_{t1}^{i,c} x_{t1}^j(0)$$

$$F_x x(0) + F_0 \rho + \sum_{j \in \mathcal{J}_h} F_j \rho^j + \sum_{t=0}^{N} F_b z(t) + F_u u_1(t) \leq 0,$$

$$j \in \mathcal{J}_h \subseteq \{1, \ldots, n_\phi\}$$
$$t = 0, \ldots, N$$
$$z(t) \in \{0, 1\}^{n_z}$$

in which the number of variables is reduced but the block sparsity structure of the constraints is completely lost.

Decision Making System

Figure 7:
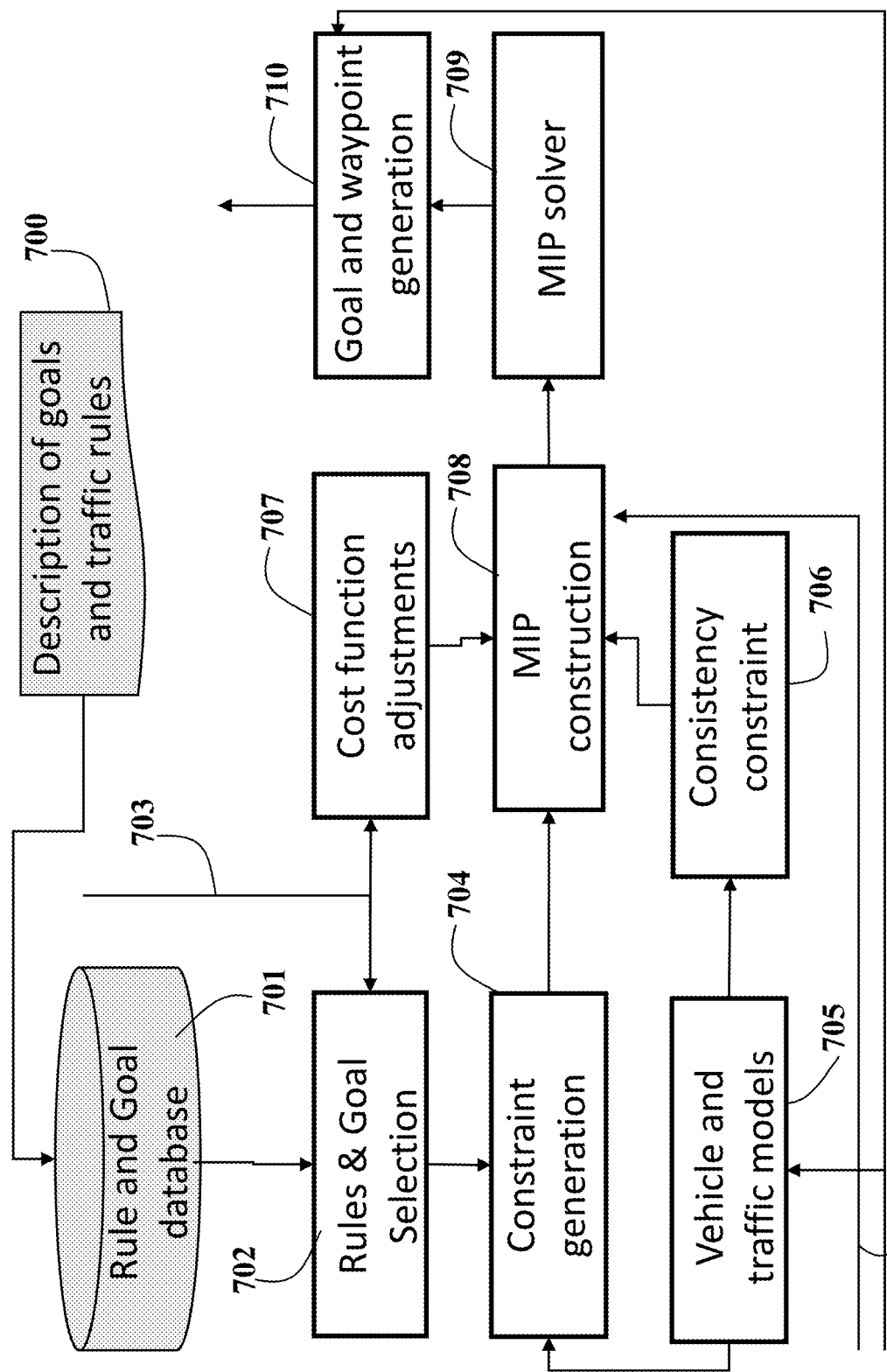
FIG. 7 is a block diagram of the decision-making system as used in some embodiments of the present disclosure.

FIG. 7 describes a block diagram of the DMS according to some embodiments. The rules and goals described as natural language, i.e., rule book and everyday language, are transformed into STL formulae using the language described by Equations (1), (2) and stored in a database 701, stored in the memory 202, for instance in the third section 213. The Rule & Goal Selection module 702 selects from the database 701 the rules and goals that apply to the current situation according to the information for the current and upcoming road segments, as provided 703 by the Routing Module 301. The STL formulae for the current rules and goals are converted into mixed integer constraints (15a) according to (12), (13), (14), and they are assembled with constraints obtained from the motion models of vehicles and traffic 705, resulting in the partially block structured constraints (29). In different embodiments, such may be compressed in block 704 resulting into the dense form (28).

Some embodiments are based on recognition that for the MIP solver it is more efficient to solve problems in fully structured form, so that in some embodiments of the present invention block 704 performs a transformation to the constraints to in a full block structured form, as detailed below.

From vehicle and traffic models 705 the model error sets for ego vehicle and traffic, $W_t$ and Win (22), (26), respectively, are computed possibly using current vehicle information from sensors and estimators, 307, and provided to the block constructing a consistency constraint. The Consistency Constraint block 706 computes a robustness score $\mathcal{R}$, to be enforced as a constraint (15b), for instance in (29), that by effectively tightens the mixed integer constraints enforcing the STL formulae to ensure that the intermediate goals computed by DMS according to the first model of the motion of the vehicle, allows the MPS to compute a trajectory according to the second model of motion of the vehicle that still achieves the goal and satisfies the traffic rules. Also, from the data 703 from the Routing Module 301, the parameters of the cost function are adjusted 707. The constraints from 704, the cost function from 707, and the consistency constraints 706, are combined to construct 708 the mixed integer programming problem in partially block structured form (29), or fully dense form (32). Advantageously, for the MIP solver it is more efficient to solve problems in fully structured form, and hence the mixed integer programming problem may be constructed as in a full block structured form, as detailed below. The MIP problem is then processed by a mixed integer solver algorithm 709, which computes its solution from which the information on the next intermediate goals is extracted 710 to be provided to the MPS in the motion planning submodule 304 of the planning and control module 303. In some embodiments of the present invention the next intermediate goals computed from the solution of the MIP problem are provided to the MPC as waypoints for the trajectory, i.e., points that the trajectory need to go through.

Figure 8:
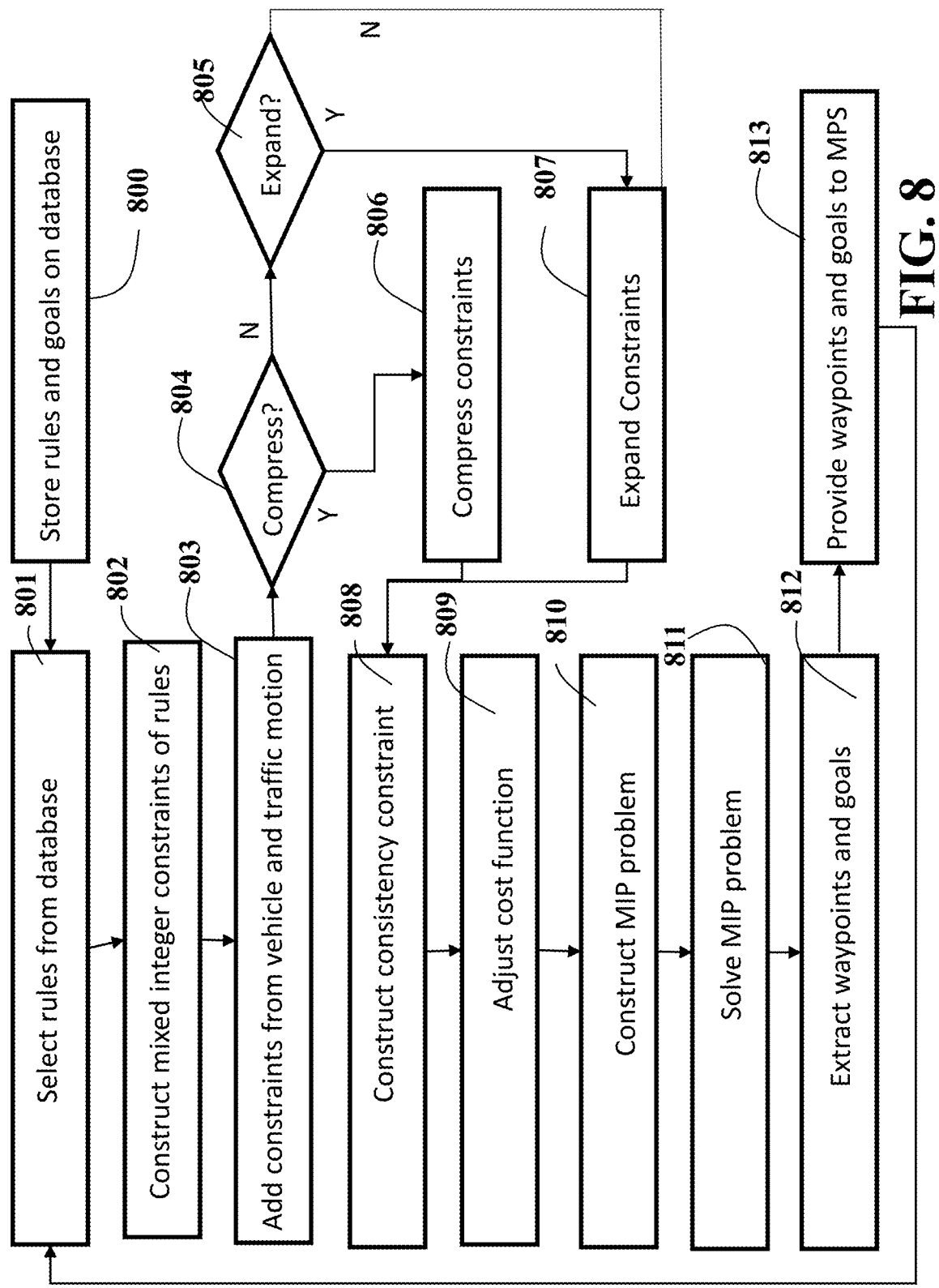
FIG. 8 is a flowchart of the operation of the decision-making system as used in some embodiments of the present disclosure.

FIG. 8 shows a flowchart of the computations performed by the DMS in a sequential form according to some embodiments. These embodiments are based on recognition that synthesizing a software program enforcing traffic rules expressed in natural language, i.e., everyday language, is error prone and time consuming, while it is more effective to convert the traffic rules expressed in natural language into formulae of a formal language, and then to synthesize the software program from such formulae. Thus, the traffic rules and goals specifications are constructed 800 as STL formulae from natural language descriptions, such as in driving rules books, and stored in database 700. In various implementations, the traffic rules can vary in different roads, not just quantitatively, i.e., how much is the maximum velocity, but also in applicability, e.g., are there any turn restrictions, is passing allowed, etc. Thus, among the many rules in the database, the DMS selects 801 the ones that apply to the current driving conditions based on the routing information from the routing module 301 and on the map stored in the memory, such as the number of lanes, turn restrictions in each lane, passing allowed, status of traffic, etc.

It is a realization of some embodiments that due to the enforced rules changing a controller code cannot be synthesized as a single controller beforehand but is adjusted continuously by adding and removing rules. Thus, some embodiments implement the DMS as an optimization problem where the STL formulae describing traffic rules goals are constructed 802 as constraints, and the constraints are added and removed from the optimization problem, according to the added and removed traffic rules and goals 802. The first model of the vehicle motion and of the traffic motion for predicting vehicle and traffic behaviors, respectively, are also added 803 as constraints. Then, the DMS decides based on solver parameters and problem dimensions if 804 to compress the constraints to a fully dense form, that results in transforming the constraints from (27) to (28). In this case, the problem dimensions are reduced which allows for faster solution in certain cases, especially if the original problem is of small dimensions. However, some MIP solver algorithms may be more efficiently applied to problem with block structured form, resulting in reduction of memory and computing time, which allows the approach to be applied in real-time operations. Thus, if 804 the problem is not compressed, the DMS decides based on solver parameters and problem dimensions if 805 to expand the constraints to a fully block structured form.

Note that the dense and block-structured mixed-integer optimization problem formulation of the DMS are fully equivalent. However, some embodiments of the invention are based on the realization that the block-structured MIP formulation can be computationally more efficient than the fully dense MIP formulation for one or multiple of the MIP solution 811 steps, including any pre-processing steps, the discrete search process and the solution of convex relaxations. Examples of pre-processing steps are domain propagation to tighten constraints on individual discrete and/or continuous variables as well as dual fixings and substitutions. An example of a discrete search process for mixed-integer programming is a branch-and-bound optimization algorithm, which is based on successively tightening the bounds on one or multiple discrete optimization variables and it requires the solution of convex relaxations to construct local lower bounds to the MIP solution. An example of a convex relaxation of a mixed-integer quadratic program (MIQP) is based on replacing each of the discrete optimization variables by continuous optimization variables that are each constrained to be between its smallest and largest discrete possible value. In addition, some embodiments of the invention are based on the realization that the block-structured MIP formulation can be more efficient in terms of memory requirements than the fully dense MIP formulation in order to store the MIP problem data, the intermediate variables in the MIP optimization algorithm and the MIP solution vectors.

Some embodiments of the invention use an implementation of the DMS that is based on a block-structured formulation of the MIP, in which both the linear-quadratic cost function and the linear equality and inequality constraints exhibit a block-structured sparsity. More specifically, each term in the objective function and each inequality constraint involves optimization variables from the same time sampling time instant as in (27). Only equality constraints, e.g., to impose a vehicle motion model such as (17) on the state variables, can involve one or multiple optimization variables at two consecutive sampling time instants. Some embodiments of the invention are based on the realization that a lifting procedure can be used to expand one or multiple of the equality or inequality constraints that involve discrete and/or continuous optimization variables from multiple sampling instants. Such a lifting procedure introduces one or multiple additional discrete and/or continuous optimization variables and it replaces each of the equality or inequality constraints, which couples variables from multiple sampling instants, by one or multiple alternative equality and/or inequality constraints that involve only optimization variables from the same sampling time instant as in (27).

Given an STL formula 0, a lifting procedure can define optimization variables $u_t^\phi$ and $x_t^\phi$ for each sampling time instant t and define the following additional equality constraint $x_{t+1}^\phi = u_t^\phi$ that imposes the state variable $x_{t+1}^\phi$ at time t+1 to be equal to the control input variable $u_t^\phi$ at time instant t. The DMS then ensures, by defining a set of mixed-integer linear constraints, that $u_t^\phi = 1$ holds if STL robustness score of $\phi$ at time t is greater than some predefined threshold value R, i.e., $\rho(\phi, \xi, t) > R > 0$. Some embodiments of the invention are based on the realization that all STL formulae can be defined in a recursive manner, resulting in equality and inequality constraints that involve only optimization variables at two consecutive sampling time instants. In some implementations, the lifting procedure can use additional state variables $x_t^\phi$, which are defined to be equal to the corresponding control input variable at the previous sampling time instant $x_{t+1}^\phi = u_t^\phi$, in order to reformulate all inequality constraints in terms of state and/or control input variables from the same sampling time instant. The lifting procedure results in an MIP formulation with a block-structured problem sparsity that can be exploited in a computationally efficient solution by a structure exploiting optimization algorithm.

For each predicate $\pi^\mu$, the corresponding variable $u_t^\mu$ can be defined as a binary optimization variable $u_t^\mu \in [0,1]$ and the inequality constraint $\mu(x_t) + M(1 - u_t^\mu) > R$ can be defined in which M>0 is sufficiently large and R>0 is the robustness threshold value. The constraint $\mu(x_t) + M(1 - u_t^\mu) > R$ implies that $\rho(\mu, \xi, t) > R > 0$ holds if $u_t^\mu = 1$. Similarly, if there is a negation operator before a predicate $\neg\mu$, the corresponding variable $u_t^{\neg\mu}$ can be defined as a binary optimization variable $u_t^{\neg\mu} \in [0,1]$ and the inequality constraint $\mu(x_t) - M(1 - u_t^{\neg\mu}) \leq -R$ can be defined. The constraint $\mu(x_t) - M(1 - u_t^{\neg\mu}) \leq -R$ implies that $\rho(\neg\mu, \xi, t) \leq -R < 0$ holds if $u_t^{\neg\mu} = 1$.

Embodiments of the invention are based on the realization that Boolean operators couple decision variables from the same sampling time instant. For example, a logical AND operator on multiple STL formulae, i.e., $\psi = \wedge_i \phi_i$, can be formulated as the following inequality constraints of $u_t^\psi \leq u_t^{\phi_i}$ for all i. Similarly, a logical OR operator on multiple STL formulae, i.e., $\psi = \vee_i \phi_i$, can be formulated as the following inequality constraint of $u_t^\psi \leq \Sigma_i u_t^{\phi_i}$. Therefore, Boolean operators automatically preserve a block-structured MIP problem sparsity.

Embodiments of the invention are based on the realization that temporal operators typically result in constraints that couple decision variables from different sampling time instants. Instead, some embodiments of the invention are based on a recursive definition for each of the temporal operators and define additional optimization variables in the lifting procedure to preserve a block-structured MIP problem sparsity. For example, the "eventually" temporal operator can be defined in a recursive manner as follows $$\rho(\Diamond_{[a,b]}\phi, \xi, t) = \rho(\Diamond_{[a-1,b-1]}\phi, \xi, t+1), \text{ if } a>0,$$

$$\rho(\Diamond_{[a,b]}\phi, \xi, t) = \max(\rho(\phi, \xi, t),$$

$$\rho(\Diamond_{[0,b-1]}\phi, \xi, t+1)), \text{ if } a=0 \quad (33)$$

which couples decision variables only at two consecutive sampling time instants. In addition, note that $\rho(\Diamond_{[0,0]}\phi, \xi, t) = \rho(\phi, \xi, t)$ holds.

Based on the recursive definition of the "eventually" temporal operator $\varphi = \Diamond_{[a,b]}\phi$ and by defining additional auxiliary decision variables, the lifting procedure can implement the DMS based on constraints that involve only state and/or control input variables from the same sampling time instant:

$$x_{t+1}^\varphi = u_{t+1}^{\tilde\varphi}, \tilde\varphi = \Diamond_{[a-1,b-1]}\phi, \text{ if } a>0,$$

$$x_{t+1}^\varphi = x_{t+1}^\phi \vee u_{t+1}^{\tilde\varphi}, \tilde\varphi = \Diamond_{[0,b-1]}\phi, \text{ if } a=0,$$

$$u_t^\varphi = u_t^\phi, \text{ if } a=b=0, \quad (34)$$

where the additional equality constraints $x_{t+1}^\psi = u_t^\psi$ and $x_{t+1}^\phi = u_t^\phi$ have been used in order to avoid coupling between control input variables at two consecutive sampling time instants. Instead, the lifting procedure restricts the coupling between decision variables from consecutive time instants to be of a form where state variables at a particular time instant are defined by a combination of one or multiple state and/or control input variables at the previous sampling time instant.

A similar approach can be used in the lifting procedure to formulate the "always" temporal operator $\varphi = \square_{[a,b]}\phi$ as $$x_{t+1}^\varphi = u_{t+1}^{\tilde\varphi}, \tilde\varphi = \square_{[a-1,b-1]}\phi, \text{ if } a>0,$$

$$x_{t+1}^\varphi = x_{t+1}^\phi \wedge u_{t+1}^{\tilde\varphi}, \tilde\varphi = \square_{[0,b-1]}\phi, \text{ if } a=0,$$

$$u_t^\varphi = u_t^\phi, \text{ if } a=b=0. \quad (35)$$

as well as the "until" temporal operator $\varphi = \phi_1 \mathcal{U}_{[a,b]} \phi_2$ as $$x_{t+1}^\varphi = x_{t+1}^{\phi_1} \wedge u_{t+1}^{\tilde\varphi}, \tilde\varphi = \phi_1 \mathcal{U}_{[a-1,b-1]} \phi_2, \text{ if } a>0,$$

$$x_{t+1}^\varphi = x_{t+1}^{\phi_2} \vee (x_{t+1}^{\phi_1} \wedge u_{t+1}^{\tilde\varphi}), \tilde\varphi = \phi_1 \mathcal{U}_{[0,b-1]} \phi_2, \text{ if } a=0,$$

$$u_t^\varphi = u_t^{\phi_2}, \text{ if } a=b=0. \quad (36)$$

while preserving the block-structured sparsity in the MIP problem formulation.

The DMS then determines 808 the required margin $\mathcal{R}$, in the robustness score and constructs the consistency constraint (15b). In some embodiments, the DMS and MPS use different models for vehicle motion because they need different prediction horizon, and hence different precisions. Specifically, the DMS uses a first model of the vehicle motion (16), which is less precise because it needs to be predicted for longer time while maintaining the computation time to be small to be executed in real-time. Instead, the MPS uses a second model of the vehicle motion (18), which is more precise because it is predicted for shorter time, so that the computation cost will still be small. However, if the DMS goals produced with the first model are executed in MPS according to a second model, the specifications that are satisfied by DMS can be violated in MPS.

Figure 9:
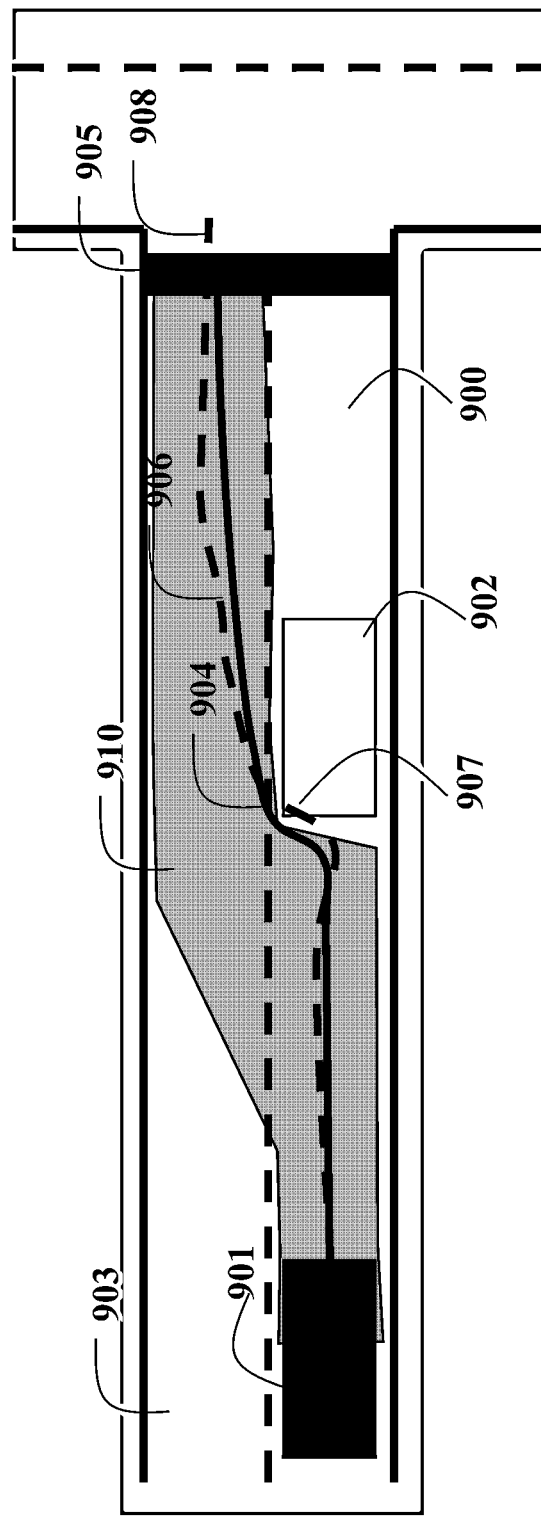
FIG. 9 illustrate the effect of computing a sequence of goals based on a first model of motion of the vehicle and then executing the goals in a second first model of motion of the vehicle.

FIG. 9 illustrates the effect of computing a sequence of intermediate goals based on a first model of the vehicle and then executing the goals in a second model of the vehicle according to some embodiments. For instance, in FIG. 9 the vehicle 901 is in a first lane 900 and has to move to a second lane 903 to avoid a traffic vehicle 902 and stop at the stopline 905. The DMS computes a set of intermediate goals as waypoints based on the trajectory 904 computed according to the first model of the vehicle, such that the trajectory according to the first model of the vehicle motion connecting such waypoints is inside the area 910 where the STL specifications of traffic rules are satisfied. However, when the MPS executes the waypoints according to the second model of motion of the vehicle, the resulting trajectory 906 leaves the correct area 910, and in practice causes a collision 907 with the traffic vehicle and misses the stop area by stopping after 908 the stopline. That occurs because the first and the second model of vehicle motion are different and hence a trajectory that can be executed according to the first model may not be executed according to the second model.

To address this inconsistency, some embodiments rather than trying to satisfy the nominal STL formulae on the first model accounting for any possible error difference between the first and second model, enforce with respect to the first model the STL formulae tightened by a robustness margin. Thus, in some embodiments, the DMS determines the robustness margin $\mathcal{R}$, for enforcing the STL formulae to ensure that if a motion plan computed based on the first model of the motion of the vehicle satisfies the STL formulae according to the margin $\mathcal{R}$, then a motion plan can be computed according to the second model of motion of the vehicle that still satisfies the STL formulae without such margin $\mathcal{R}$. In some embodiments, the robustness margin $\mathcal{R}$, is computed based on the error set W in (22) and $W_t$ in (26), $$R = \min_{R, \rho_i} R \qquad (37)$$
$$\text{s.t. } \rho_i(x) \geq R \Longrightarrow \rho_i(x + M_R^v w + M_R^t w_t) \geq 0,$$
$$\forall w \in W, w_t \in W_t, \forall x \in X_\rho, \forall i \in \mathcal{I}_h$$

where $M\mathcal{R}^v$, $M\mathcal{R}^t$ are matrices applying the error to the appropriate components of the state vector x and all values of x in the set $X_\rho$ are considered. In some embodiments, the predicates in the STL formulae are defined by polytopic constraints $H^i x \leq K^i$, and the robustness margin is computed by determining the maximum increase in the constraints caused by elements in the disturbance set W, $$\overline{w}_j^i = \underset{w \in W}{\operatorname{argmax}} \left[ H^i w \right]_j, \rho_i = \max_j \overline{w}_j^i,$$

and then repeating the same for the traffic using the set $W_t$, and computing $\mathcal{R}$ from the relations in (3). In some embodiments of the present invention the robustness margin is enforced by including the robustness score constraint $$\rho(x) \geq R$$

and imposing that each mixed-integer logical constraints is satisfied with margin $\rho_i$ computed from $\rho$ and the robustness score for the corresponding formula according to (11).

Figure 10:
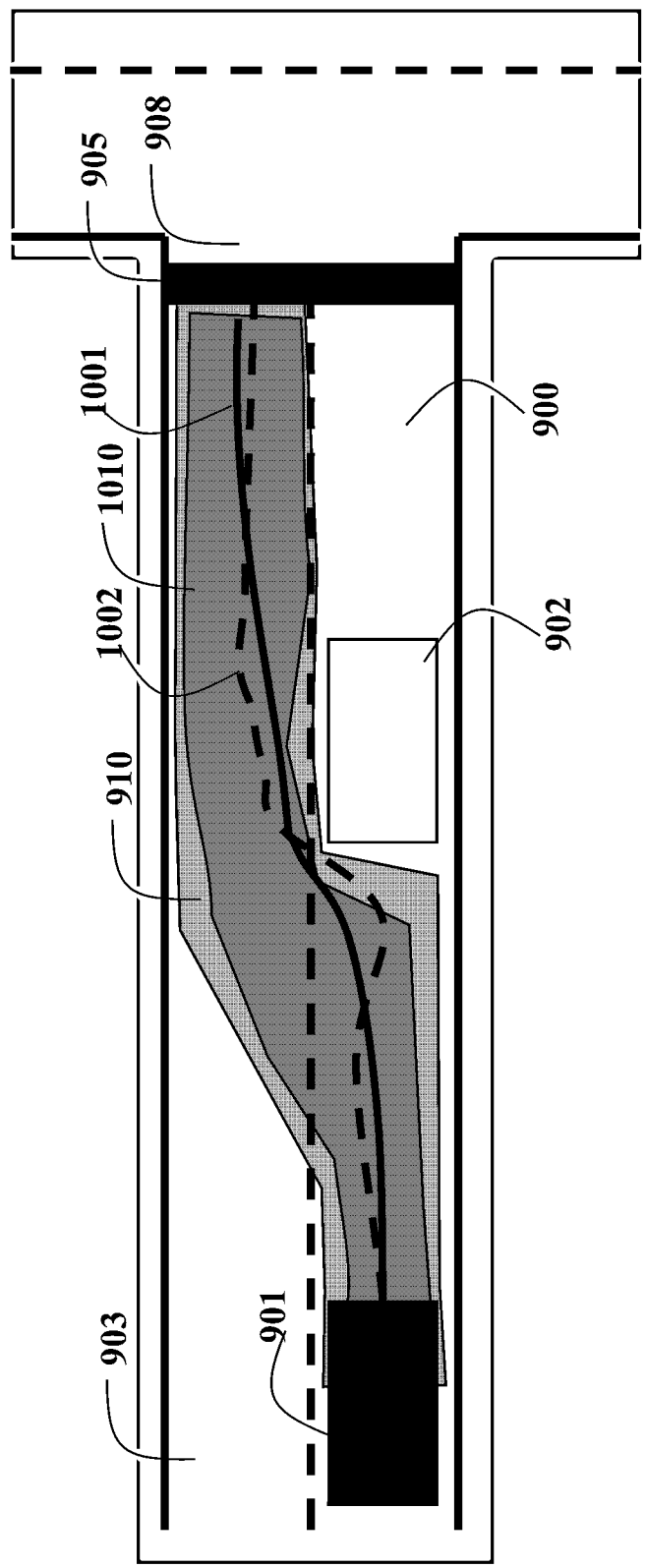
FIG. 10 illustrate the effect of robustness margin when computing a sequence of goals based on a first model of motion of the vehicle and then executing the goals in a second first model of motion of the vehicle.

FIG. 10 shows a schematic of an effect of robustness margin when computing a sequence of goals based on a first model of motion of the vehicle and then executing the goals in a second first model of motion of the vehicle according to some embodiments. The effects of the robustness margin are exemplified in FIG. 10 for the same scenario as FIG. 9, where 1010 is the region where the STL formulae are satisfied with robustness margin, so that the DMS trajectory 1001 computed according to the first model is inside the region 1010, and the resulting MPS trajectory 1002 computed according to albeit not in the region 1010 due to the difference between the first and second model, is still inside region 910 where the formulae are satisfied.

In some implementations, the DMS then constructs 809 the cost function $$J(\{(x(t), u(t))\}_t, \rho)) = J_p(\{(x(t), u(t))\}_t) + J_r(\rho) = \alpha \overline{J}_p(\{(x(t), u(t))\}_t) + (1-\alpha) \overline{J}_r(\rho) \qquad (38)$$

which includes two terms, a performance term and a robustness term. The performance term $J_p$ is used to enforce the desired behavior of the vehicle such as driving near the center of the lane, maintaining a speed close to a defined target, and includes states and inputs of the first model of the vehicle. In some embodiments of the present invention $J_p$ is defined by a quadratic cost of states and inputs as in (30), possibly with respect to reference values for states and inputs, $r_x$, $r_u$ $$\overline{J}_p = \sum_{t=0}^{N} (r_x(t) - x(t))' Q(r_x(t) - x(t)) + (r_u(t) - u_1(t))' \Theta(r_u(t) - u_1(t)) \qquad (39)$$

The performance term $J_r$ is used to increase the robustness of the solution, and it can be formulated as a quadratic function in (31) with respect to the robustness score $\rho$.

The cost function (38) contains a parameter a which determines the balancing of the robustness objective and the performance objective. The DMS adjusts $\alpha$ to the current driving condition by increasing $\alpha$ when higher performance is sought, and decreasing $\alpha$ when higher robustness is sought, with the case of $\alpha=1$ and $\alpha=0$ being the limits when only performance or only robustness are sought, respectively.

Then the DMS constructs 810 the MIP problem from the current state of the vehicle and traffic obtained from sensors and estimators, from the vehicle and STL formulae constraints, from the robustness constraint, and from the cost function, $$\min_Z Z^T H Z + C^T Z \qquad (40)$$
$$\text{s.t. } G_i Z \leq K_i$$
$$G_e Z = K_e$$
$$F_b Z \in \{0, 1\}$$

where Z collects all the decision variables for the MIP problem, $F_b$ defines what variables are Boolean, and matrices H, $G_i$, $G_e$, may be dense if the MIP problem if the check 804 was satisfied, partially block sparse, if the checks 804 and 805 were not satisfied, or fully sparse if the check 804 was not satisfied, and the check 805 was satisfied. The optimal solution of MIP problem (40) is denoted by Z*.

The MIP problem is solved 811 by a MIP solver algorithm running in the processor 201. In some embodiments, the MIP solver is capable of exploiting the structure of the constraints, for instance when the constraints are transformed 807 in expanded form.

Figure 11A:
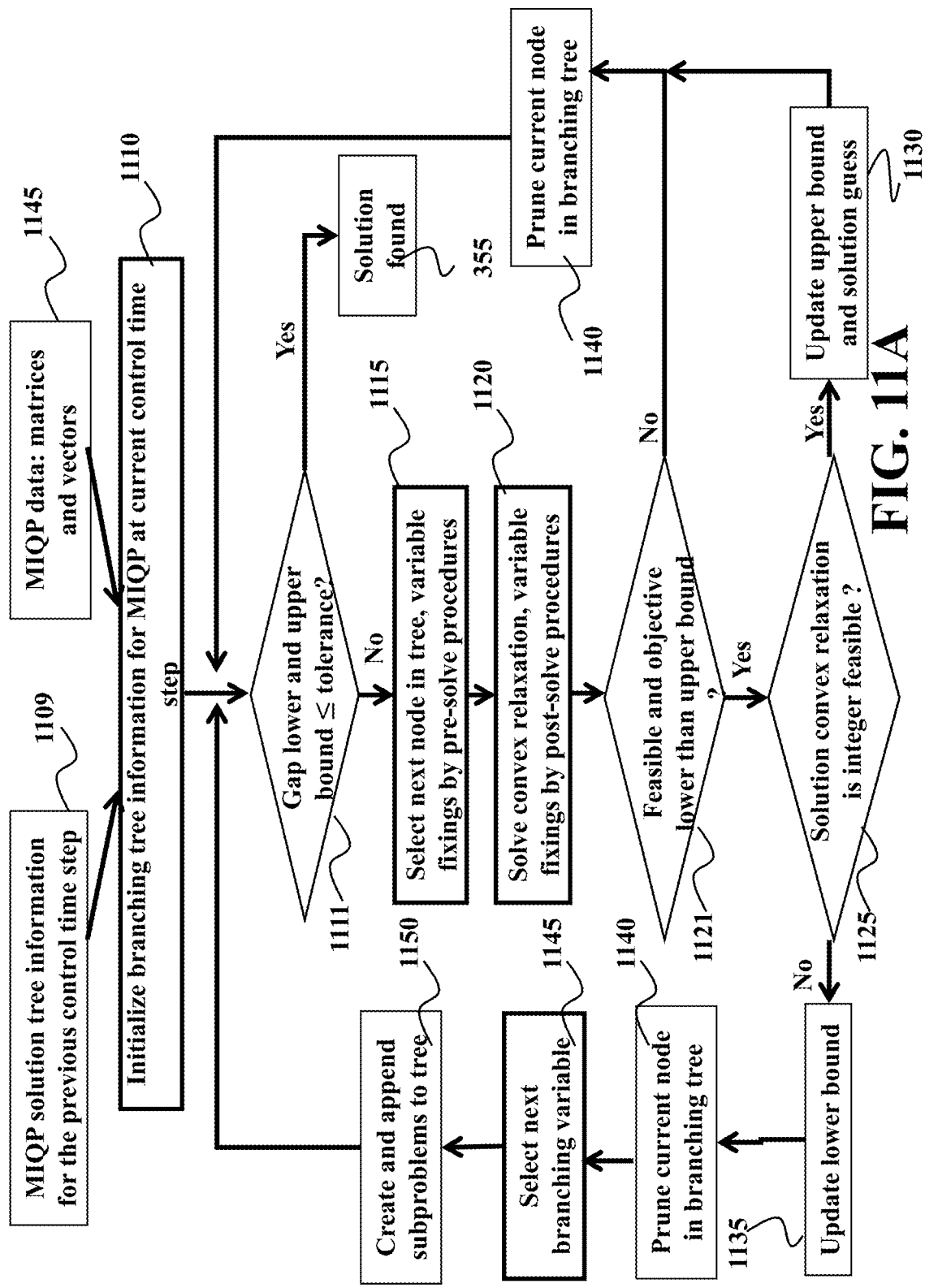

FIG. 11A shows a block diagram and FIG. 11B shows pseudo code of an exemplar branch-and-bound optimization algorithm to solve MIP according to some embodiments. The branch-and-bound method initializes the branching search tree information for the mixed-integer quadratic program (MIQP) at the current control time step 1110, based on the MIQP data 1145 that include MIQP matrices and MIQP vectors forming the structure of the MIP. The initialization can additionally use the branching search tree information and MIQP solution information from the previous control time step 1109 in order to generate a warm started initialization for the current control time step 1110. The main goal of the optimization algorithm is to construct lower and upper bounds on the objective value of the mixed-integer control solution. If the gap between the lower and upper bound value is smaller than a particular tolerance value 1111, then the mixed-integer optimal control solution is found 1155.

As long as the gap between the lower and upper bound value is larger than a particular tolerance value 1111, and a maximum execution time is not yet reached by the optimization algorithm, then the branch-and-bound method continues to search iteratively for the mixed-integer optimal control solution 1155. Each iteration of the branch-and-bound method starts by selecting the next node in the tree, corresponding to the next region or partition of the integer variable search space, with possible variable fixings based on pre-solve branching techniques 1115. After the node selection, the corresponding integer-relaxed MPC problem is solved, with possible variable fixings based on post-solve branching techniques 1120.

If the integer-relaxed MPC problem has a feasible solution, then the resulting relaxed control solution provides a lower bound on the objective value for that particular region or partition of the integer variable search space. In case that this lower bound is larger than the currently known upper bound for the objective value of the optimal mixed-integer control solution 1121, then the selected node is pruned or removed from the branching tree 1140. If the objective is lower than the currently known upper bound 1121, and the relaxed control solution is integer feasible 1125, then the currently known upper bound and corresponding mixed-integer control solution guess needs to be updated 1130.

If the integer-relaxed MPC problem has a feasible solution and the objective is lower than the currently known upper bound 1121, but the relaxed control solution is not yet integer feasible, then the global lower bound for the objective can be updated 1135 to be the minimum of the objective values for the existing nodes in the branching tree and the selected node is pruned from the tree 1140. In addition, starting from the current node, a discrete variable with a fractional value is selected for branching according to a particular branching strategy 1145, in order to append the resulting subproblems, corresponding to regions or partitions of the discrete search space, as children of that node in the branching tree 1150.

An important step in the branch-and-bound method is how to create the partitions, i.e., which node to select 1115 and which discrete variable to select for branching 1145. Some embodiments of the invention are based on branching one of the binary control variables with fractional values in the integer-relaxed MPC solution. For example, if a particular binary control variable $u_{i,k} \in \{0,1\}$ has a fractional value as part of the integer-relaxed MPC solution, then some embodiments create two partitions of the mixed-integer program by adding, respectively, the equality constraint $u_{i,k}=0$ to one subproblem and the equality constraint $u_{i,k}=1$ to the other subproblem. Some embodiments of the invention are based on a reliability branching strategy for variable selection, which aims to predict the future branching behavior based on information from previous branching decisions.

Some embodiments of the invention are based on a branch-and-bound method that uses a depth-first node selection strategy, which can be implemented using a last-in-first-out (LIFO) buffer. The next node to be solved is selected as one of the children of the current node and this process is repeated until a node is pruned, i.e., the node is either infeasible, optimal or dominated by the currently known upper bound value, which is followed by a backtracking procedure. Instead, some embodiments of the invention are based on a branch-and-bound method that uses a best-first strategy that selects the node with the currently lowest local lower bound. Some embodiments of the invention employ a combination of the depth-first and best-first node selection approach, in which the depth-first node selection strategy is used until an integer-feasible control solution is found, followed by using the best-first node selection strategy in the subsequent iterations of the branch-and-bound based optimization algorithm. The latter implementation is motivated by aiming to find an integer-feasible control solution early at the start of the branch-and-bound procedure (depth-first) to allow for early pruning, followed by a more greedy search for better feasible solutions (best-first).

The branch-and-bound method continues iterating until either one or multiple of termination conditions are satisfied. The termination conditions include the maximum execution time for the processor is reached, all the nodes in the branching search tree have been pruned, such that no new node can be selected for solving convex relaxations or branching, and the optimality gap between the global lower and upper bound value for the objective of the mixed-integer control solution is smaller than a tolerance value.

The intermediate goals for the MPS are then extracted 812 from the MIP solution Z* possibly as waypoints. For instance, from the sequence of vehicle states $(x^*_1(t), x^*_1(t+1), \ldots x^*_i(t+N))$ according to the first model of the vehicle computed according to the MIP solution, the DMS extract the time sequence within the future horizon of planning of the MPS, $N_{MPS}$, and $(x^*_1(t), x^*_1(t+1), \ldots x^*_1(t+N_{MPS}))$ provides 813 that to the MPS, possibly with additional information about the error set of vehicle and traffic and the robustness margin used in the computation, W, $W_t$, R.

Some embodiments consider that in a dynamic environment, such as road with autonomous and non-autonomous vehicles, changing weather conditions, etc., the predictions of the behavior of the traffic and of the vehicle may not be exact. Thus, it is advantageous to continuously evaluates the admissibility of previously computed intermediate goals, based on updated information obtained from sensors and estimators. If the goals are no longer admissible, anomalies have occurred, and appropriate corrective actions are needed. It is recognized that monitoring is computationally more efficient than recomputing. Hence, in some embodiments, the monitoring occurs more frequently than the controlling to be able to catch anomalies and react rapidly, and thus the amount of computation for the monitoring is smaller than the one for the controlling.

Thus, some embodiments use the Monitoring and Reaction System (MRS) in the monitoring and reactive module 320 to evaluate whether a previously computed sequence of intermediate goals and waypoints is still valid cording to the updated information received from sensors and estimators 307.

Figure 12:
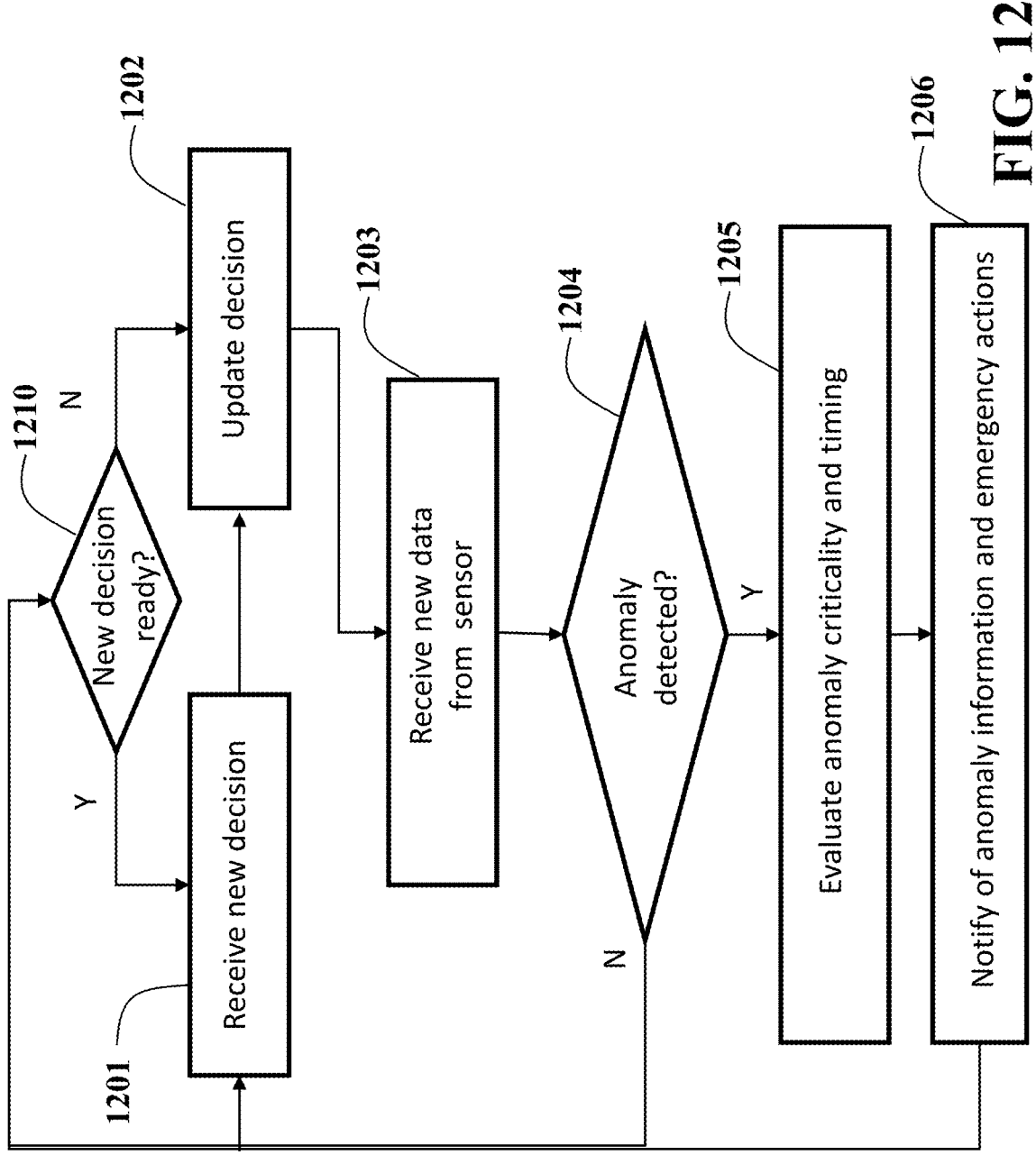
FIG. 12 is a flowchart of the operation of the monitoring and reactive system as used in some embodiments.

FIG. 12 shows a flowchart of the operation of the monitoring MRS according to some embodiments. First, the MRS checks 1210 if the DMS has prepared a new sequence of intermediate goals or waypoints, and if so receives 1201 such sequence. The MRS updates 1202 the sequence by discarding all elements that are already in the past and substituting to them the values received from sensors and estimators 307 at the corresponding time instants. When the MRS receives 1203 new data from sensors and estimators 307, it checks 1204 if the sequence of intermediate goals and waypoints is still valid by evaluating if the updated sequence of intermediate goals and waypoints still satisfies the inequalities of the MIP problem (40) computed from the same vehicle and STL formulae constraints, robustness constraint, and cost function used to compute the sequence of goals in the past when such sequence was generated, but using now the most recent information on vehicle and traffic obtained from sensors and estimators 307.

If the inequalities of (40) are not satisfied an anomaly is detected otherwise the monitor continues at the next iteration. If an anomaly is detected the MRS evaluates 1205 the criticality by determining if the anomaly is a vehicle safety risk, a major traffic violation or a minor traffic violation, and when such an anomaly occurs, whether in the immediate future, e.g., within the next two cycles of updates of decision updates by the DMS, or in the far future, e.g., after two of such DMS update cycles. It is recognized that since in monitoring the only action is to evaluate whether the constraints of the MIP problem (40) are satisfied for the sequence of intermediate goals and waypoints updated with the most current sensors or estimators information, rather than actually computing a sequence of intermediate goals and waypoints that satisfies the constraints and minimizes the cost, the MRS performs much fewer computations and can hence execute at much higher rate than the DMS as necessary for frequent vehicle monitoring.

Then, the MRS identifies the corrective actions. In some implementations, the corrective actions can vary based on the type of anomaly. For example, if the anomaly is a minor traffic violation, such as a small crossing of the sideline, or a small overspeeding, an urgent adjustment request signal is generated. If the anomaly is a major traffic violation, such as not stopping at an intersection, or crossing into the opposite lane, an error correction request signal is generated. If the anomaly is a vehicle safety risk, such as a predicted collision with traffic or pedestrians or a full out of road excursion, an emergency request signal is generated. The signals are defined of type warning, if their triggers occur in the far future, or fault if they occur in the near future.

Finally, the MRS provides the anomaly information and the signals and their type to all the submodules of Planning and Control modules. For instance, warnings can be recorded and used to ignore previously computed plans, while errors trigger immediate recomputation of part of the plans. Emergency requests can cause immediate emergency stopping handled by the actuator control 306, error requests can cause re-computation of the trajectory by the MPS 304 and its tracking by the vehicle control 305, while urgent adjustments may be handled only by re-executing the decision-making module 302.

Exemplar Embodiments

One exemplar embodiment discloses a control system for controlling a motion of a vehicle to a target driving goal in routing selected according to a desired destination of the vehicle. In one implementation, the control system is arranged on the controlled vehicle, such as an autonomous or semi-autonomous vehicle. In another implementation, the control system is arranged on a road side unit (RSU) and commutatively connected to the controlled vehicle. The motion of the vehicle is controlled by determining and submitting control commands, such as velocity and/or acceleration values, to the actuators of the vehicle.

In various implementations, the target driving goal is selected according to the desired destination of the vehicle. Examples of the target driving goal includes the desired destination as well as extended desired destination annotated with desired states of the vehicle at the desired destination. For example, the desired destination can be a nearby supermarket, while the extended desired destination can be stopping at a parking lot of the nearby supermarket. For example, the desired destination can be exit from a highway performed in autonomous driving mode, while the extended desired destination can be the end of the highway ramp with the maximum allowed or possible speed. Additionally or alternatively, the target driving goal can be a function of a destination on a route to the desired destination. For example, the target driving goal can be an entrance into a region of streets controlled by dedicated RSU.

The control system includes a memory configured to store a first model and a second model of the vehicle. The first model can include one or combination of a first motion model of the vehicle and a first traffic model of motion of a traffic in proximity of the vehicle. The second model can include a second motion model of the vehicle and a second traffic model of motion of the traffic. The motion models define dynamics of the motion of the vehicle as a function of time. Examples of the motion model can be found in Equation (16)-(19). The traffic models define dynamics of the traffic in proximity of the controlled vehicle. Examples of the traffic model can be found in Equation (23)-(26). A combination of the motion and traffic models allows to control the dynamics of the controlled vehicle while predicting the possible dynamics of the traffic around the vehicle, which is necessary to ensure correct operation of the driving, for instance for avoiding collisions with nearby traffic.

In various embodiments, the first model is an approximation of the second model configured to reduce an amount of computations required to evaluate the first model with respect to an amount of computations required to evaluate the second model. Examples of such an approximation includes reduction of an order of the motion model that defines a number of state variables. For example, in one embodiment an order of the second model is higher than an order of the first model. Another example of such an approximation is simplification of equations defining dynamics of the vehicle and/or the traffic. For example, the first motion model can include linear equations approximating non-linear equations of the second model. In such a manner, the computation according to the first model is simplified with respect to the computation according to the second model.

The control system includes at least one processor coupled with stored instructions implementing modules of the control system. The modules include a decision-maker configured to determine a sequence of intermediate goals leading to the target driving goal by optimizing the motion of the vehicle subject to the first model and tightened driving constraints formed by tightening driving constraints by a safety margin. Hence, the objective of the decision-maker module includes determination of the intermediate goals leading to the target driving goal with an approximated/coarse first model. Examples of the intermediate goals depend on the type of the target driving goal and can include staying in the current lane, changing the lane, stopping at the stop sign before making a left turn, etc.

Because different sequences of intermediate goals can lead to the same target driving goal, the decision-maker performs an optimization to select an optimum sequence.

The optimization is performed subject to driving constrains that include mixed logical inequalities of temporal logic formulae specified by traffic rules and the routing. Examples of the traffic rules include speed limits, rules for passing the intersection, preference for maintaining a position in a center of a lane, as well as requirements not to collide with other vehicles and pedestrians. The traffic rules change based on the state of the first model. For example, the traffic rules change in response to a change of the speed limit on a current section of the road, as well as in response to a change in the traffic situations. Examples of routing include indications to align in a specific lane before an intersection, to make a specific turn at the intersection, to turn in a different street, to inter in the highway, to leave the road to a parking lot, etc.

To that end, a control system of some embodiments is connected to various sensors of the controlled vehicle, sensors of other vehicles forming the traffic and/or RSU, as well as databases of traffic rules enabling the control system to select current traffic rules based on state of the vehicle as well as the routing defining direction to the target driving goal.

Representing the traffic rules as driving constraints allows the control system to reuse the same optimization routine for different traffic rules. For example, one embodiment just updates the driving constraints in response to the change of the traffic rules while preserving the optimization routine. To simplify the computation, the driving constraints include mixed logical inequalities of temporal logic formulae specified by traffic rules and the routing.

In addition to simplification of the optimization, some embodiments use the driving constraints to account for a difference between the first and the second models. To that end, the decision-maker performs the optimization subject to the tightened driving constraints. Specifically, the mixed logical inequalities of the driving constraints define an area where the temporal logic formulae are satisfied. The tightened driving constraints shrink that area by the safety margin, which is a function of a difference between the second model and the first model.

In such a manner, the intermediate goals determined based on the first model but subject to tightened driving constraints can be used by more accurate second model with the original driving constraints. This allows the control system to include a motion planner configured to determine a motion trajectory of the vehicle tracking the sequence of intermediate goals by optimizing the motion of the vehicle subject to the second model. Hence, the motion planner can track the intermediate goals instead of trying to run its own optimization routine to simplify the computation while preserving safety guarantees. To control the motion of the vehicle, the control system includes a controller configured to generate and submit control commands to at least one actuator of the vehicle to follow the motion trajectory.

In some embodiments, the safety margin is selected such that for all states of the vehicle satisfying the tightened driving constraints according to the first model of the vehicle, there is a control input that transitions the state of the vehicle according to the second model without violating the driving constraints. In such a manner, the operations according to the first and second models are balanced with each other.

There are number of different approaches for selecting the safety margin. For example, in one embodiment, the decision-maker is configured to determine a region of states of the first model representing a difference between states of the first model obtained by transitioning transformations of states of the second model according to the first model for a set of inputs of the second model, and states of the first model obtained by transformation of states of the second model obtained by transitioning states of the second model according to the second model for a set of inputs of the second model; and determine the safety margin for tightening the driving constraints such that, for any state of the first model that satisfies the tightened driving constraints, a combination of the same state with any state in the region of states satisfies the driving constraints. Such a state-based determination of the safety margin is advantageous because it can be computed exactly or approximately for many choices of first and second models Different implementations of the decision-maker module use different optimization solvers. For example, one embodiment solves a mixed integer problem (MIP) that optimizes an MIP objective function subject to the tightened driving constraints to produce the sequence of intermediate goals according to a solution of the MIP. To that end, in this embodiment, the decision-maker is configured to select the temporal logic formulae from a database of signal temporal logic (STL) specifications based on a current state of the vehicle, a current state of a traffic and the next target location; transform the selected temporal logic formulas into the driving constraints; tighten the driving constraints according to the safety margin; and solve a MIP subject to the tightened driving constraints to produce the sequence of intermediate goals according to a solution of the MIP. This embodiment takes advantage of approximation of the first model to reduce the decision making to solving the MIP.

Some embodiments use different techniques to simplify the MIP solver by preserving a sparse structure of the MIP solution. For example, in some implementations, the decision-maker is configured to lift the MIP into a higher dimension by introducing one or combination of additional optimization variables and additional constraints to achieve a block-sparsity of the MIP formulation; and solve the MIP in the higher dimension. Despite an introduction of additional variables, the sparse structure of the MIP in the lifted domain can still provide computational advantages.

To that end, in one implementation, the lifting is performed such that each term in the MIP objective function and each MIP inequality constraint involves one or multiple optimization variables from the same sampling time instant and each MIP equality constraint only involves one or multiple optimization variables from the same sampling time instant or one or multiple optimization variables from two consecutive sampling time instants Additionally or alternatively, in one implementation, the lifting introduces additional optimization variables to replace each of the equality or inequality constraints that couple variables from multiple sampling time instants by one or multiple alternative equality and inequality constraints that involve only optimization variables from the same sampling time instant, and the additional optimization variables are state variables equal to the corresponding control input variable at the previous sampling time instant. Examples of such lifting are described in relation to the most common temporal operators, e.g., including the temporal operators "eventually", "always" and "until", that can be used in the temporal logic formulae of the decision-maker.

Additionally, or alternatively, one embodiment modifies a cost function optimized by the decision-maker module to achieve a desired balance between vehicle performance, e.g., time to reach the final destination, and robustness, i.e., how much the obtained decisions are resistant to unexpected behavior of the environment. For example, in one implementation, the decision-maker optimizes a cost function including a first term encouraging an achievement of the next target goal and a second term encouraging an increase of the safety margin. An example of the term encouraging an achievement includes the distance from the next target. An example of the term encouraging an increase of the safety margin includes a coefficient defining the safety margin above the minimum. Such a modification allows to adjust relative importance of the first and second term based on the current traffic conditions by modifying a non-negative weight parameter in the cost function.

In some embodiments, the modules of the control system include an anomaly detector that can take advantage of cheaper computations of decision maker to test whether there is a danger to the safety of the vehicle and/or whether the more computationally expensive motion planner needs to be re-executed. To that end, the anomaly detector is configured to periodically receive the sequence of intermediate goals determined by the decision maker for the tightened driving constraints; update the tightened driving constraints based on a change in the state of the first model defining a change in the states of the vehicle and the traffic; test whether the sequence of intermediate goals violates the updated tightened driving constraints; and, upon detecting the violation, execute a corrective action. In such a manner, the vehicle can still be controlled according to determined trajectory even when some changes in the state of the vehicle and/or traffic took place.

For example, in one implementation, to update the tightened driving constraints, the anomaly detector is configured to receive updated information from sensors on current and past positions of the controlled vehicle and the traffic; and determine the tightened driving constraints for the updated current and past positions on the vehicle and the traffic. The current and past positions of the controlled vehicle and the traffic can be received from various sensors operatively or communicatively connected with the controlled system. Such an update allows some embodiments to test the violation of the updated driving constraints on the same optimization used for determining the sequence of intermediate goals. For example, when the optimization is performed by solving a mixed integer problem (MIP), the testing whether the sequence of intermediate goals violates the updated tightened driving constraints results in testing linear inequalities, which is computationally efficient.

In different embodiments, the corrective action is selected based on the type of anomaly. For example, the type of anomaly includes one or combination of a vehicle safety risk, a major traffic violation, and a minor traffic violation. For example, the corrective action includes one or combination of an immediate emergency stopping, a re-computation of the motion planner trajectory, and a re-execution of the decision-making module. In such a manner, the controlled system can react to the anomaly situation promptly.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A control system for controlling a motion of a vehicle to a target driving goal in routing selected according to a desired destination of the vehicle, the control system comprising:

a memory configured to store a first model including one or combination of a first motion model of the vehicle and a first traffic model of motion of a traffic in proximity of the vehicle and a second model including a second motion model of the vehicle and a second traffic model of motion of the traffic, wherein the first model is an approximation of the second model; and at least one processor coupled with stored instructions implementing modules of the control system, the modules comprising:

a decision-maker configured to determine a sequence of intermediate goals leading to the next target goal by optimizing the motion of the vehicle subject to the first model and tightened driving constraints formed by tightening driving constraints by a safety margin, wherein the driving constraints include mixed logical inequalities of temporal logic formulae specified by traffic rules and the routing, wherein the mixed logical inequalities define an area where the temporal logic formulae are satisfied, wherein the tightened driving constraints shrink the area by the safety margin, and wherein the safety margin is a function of a difference between the second model and the first model, wherein the decision-maker is configured to select the temporal logic formulae from a database of signal temporal logic (STL) specifications based on a current state of the vehicle, a current state of traffic, and the next target location; transform the selected temporal logic formulas into the driving constraints; tighten the driving constraints according to the safety margin; and solve a mixed integer problem (MIP) subject to the tightened driving constraints to produce the sequence of intermediate goals according to a solution of the MIP, wherein the decision-maker is configured to lift the MIP into a higher dimension by introducing one or a combination of additional optimization variables and additional constraints to achieve a block-sparsity of the MIP formulation; and solve the MIP in the higher dimension;

a motion planner configured to determine a motion trajectory of the vehicle tracking the sequence of intermediate goals by optimizing the motion of the vehicle subject to the second model; and a controller configured to generate and submit control commands to at least one actuator of the vehicle to follow the motion trajectory.

2. The control system of claim 1, wherein the safety margin is selected such that for all states of the vehicle satisfying the tightened driving constraints according to the first motion model of the vehicle, there is a control input that transition the state of the vehicle according to the second motion model without violating the driving constraints.

3. The control system of claim 1, wherein the decision-maker is configured to determine a region of states of the first model representing a difference between states of the first model obtained by transitioning transformations of states of the second model according to the first model for a set of inputs of the first model, and states of the first model obtained by transformation of states of the second model obtained by transitioning states of the second model according to the second model for a set of inputs of the second model; and determine the safety margin for tightening the driving constraints such that, for any state of the first model that satisfies the tightened driving constraints, a combination of the same state with any state in the region of states satisfies the driving constraints.

4. The control system of claim 1, wherein the lifting is performed such that each term in the MIP objective function and each MIP inequality constraint involves one or multiple optimization variables from the same sampling time instant and each MIP equality constraint only involves one or multiple optimization variables from the same sampling time instant or one or multiple optimization variables from two consecutive sampling time instants.

5. The control system of claim 1, wherein the lifting introduces additional optimization variables to replace each of the equality or inequality constraints that couple variables from multiple sampling time instants by one or multiple alternative equality and inequality constraints that involve only optimization variables from the same sampling time instant, and the additional optimization variables are state variables equal to the corresponding control input variable at the previous sampling time instant.

6. The control system of claim 5, wherein the optimization variables include one additional input variable and one additional state variable for each temporal logic formula at each sampling time instant; wherein the additional input variable takes value one if the corresponding temporal logic formula is satisfied with a predetermined robustness score;

the additional state variable is equal to the additional input variable corresponding to the same formula at the previous sampling time instant; and the temporal logic formulae are constructed iteratively from the predicates by combinations based on logical and temporal operators.

7. The control system of claim 1, wherein the decision-maker is configured to optimize a cost function including a first term encouraging an achievement of the next target goal and a second term encouraging an increase of the safety margin.

8. The control system of claim 7, wherein the relative importance of the first and second term is adjusted based on the current traffic conditions by modifying a non-negative weight parameter in the cost function.

9. The control system of claim 7, wherein the decision-maker is configured to optimize the cost function over a first prediction horizon, wherein the motion planner is configured to generate the motion trajectory iteratively over a second prediction horizon that is shorter than the first prediction horizon.

10. The control system of claim 1, wherein the modules of the control system include an anomaly detector configured to periodically receive the sequence of intermediate goals determined by the decision maker for the tightened driving constraints;

update the tightened driving constraints based on a change in the state of the first model defining a change in the states of the vehicle and the traffic;

test whether the sequence of intermediate goals violates the updated tightened driving constraints; and upon, detecting the violation, execute a corrective action.

11. The control system of claim 10, wherein to update the tightened driving constraints, the anomaly detector is configured to receive updated information from sensors on current and past positions of the controlled vehicle and the traffic; and determine the tightened driving constraints for the updated current and past positions on the vehicle and the traffic.

12. The control system of claim 10, wherein the testing violation of the updated driving constraints is performed on the same optimization problem used for determining the sequence of intermediate goals, wherein the optimization is performed by solving a mixed integer problem (MIP), such that testing whether the sequence of intermediate goals violates the updated tightened driving constraints results in testing linear inequalities.

13. The control system of claim 10, wherein the corrective action is selected based on the type of anomaly, wherein the type of anomaly includes one or combination of a vehicle safety risk, a major traffic violation, and a minor traffic violation, and wherein the corrective action includes one or combination of an immediate emergency stopping, a re-computation of the motion planner trajectory, and a re-execution of the decision-making module.

14. A method for controlling a motion of a vehicle to a target driving goal in routing selected according to a desired destination of the vehicle, wherein the method uses a processor coupled to a memory storing a first model including one or combination of a first motion model of the vehicle and a first traffic model of motion of a traffic in proximity of the vehicle and a second model including a second motion model of the vehicle and a second traffic model of motion of the traffic, wherein the first model is an approximation of the second model, wherein the processor is coupled with stored instructions implementing the method, wherein the instructions, when executed by the processor carry out steps of the method, comprising:

determining a sequence of intermediate goals leading to the next target goal by optimizing the motion of the vehicle subject to the first model and tightened driving constraints formed by tightening driving constraints by a safety margin, wherein the driving constraints include mixed logical inequalities of temporal logic formulae specified by traffic rules and the routing, wherein the mixed logical inequalities define an area where the temporal logic formulae are satisfied, wherein the tightened driving constraints shrink the area by the safety margin, and wherein the safety margin is a function of a difference between the second model and the first model, wherein the determining a sequence of intermediate goals comprises:

selecting the temporal logic formulae from a database of signal temporal logic (STL) specifications based on a current state of the vehicle, a current state of traffic, and the next target location;

transforming the selected temporal logic formulas into the driving constraints; tighten the driving constraints according to the safety margin; and solving a mixed integer problem (MIP) subject to the tightened driving constraints to produce the sequence of intermediate goals according to a solution of the MIP, wherein the solving includes
lifting the MIP into a higher dimension by introducing one or a combination of additional optimization variables and additional constraints to achieve a block-sparsity of the MIP formulation; and
solving the MIP in the higher dimension;

determining a motion trajectory of the vehicle tracking the sequence of intermediate goals by optimizing the motion of the vehicle subject to the second model; and generating and submitting control commands to at least one actuator of the vehicle to follow the motion trajectory.

15. A non-transitory computer readable storage medium embodied thereon a program executable by a processor for performing a method, the method comprising:

accessing a first model including one or combination of a first motion model of the vehicle and a first traffic model of motion of a traffic in proximity of the vehicle and a second model including a second motion model of the vehicle and a second traffic model of motion of the traffic, wherein the first model is an approximation of the second model;

determining a sequence of intermediate goals leading to the next target goal by optimizing the motion of the vehicle subject to the first model and tightened driving constraints formed by tightening driving constraints by a safety margin, wherein the driving constraints include mixed logical inequalities of temporal logic formulae specified by traffic rules and the routing, wherein the mixed logical inequalities define an area where the temporal logic formulae are satisfied, wherein the tightened driving constraints shrink the area by the safety margin, and wherein the safety margin is a function of a difference between the second model and the first model, wherein the determining a sequence of intermediate goals comprises:

selecting the temporal logic formulae from a database of signal temporal logic (STL) specifications based on a current state of the vehicle, a current state of traffic, and the next target location;

transforming the selected temporal logic formulas into the driving constraints; tighten the driving constraints according to the safety margin; and solving a mixed integer problem (MIP) subject to the tightened driving constraints to produce the sequence of intermediate goals according to a solution of the MIP, wherein the solving includes
lifting the MIP into a higher dimension by introducing one or a combination of additional optimization variables and additional constraints to achieve a block-sparsity of the MIP formulation; and
solving the MIP in the higher dimension;

determining a motion trajectory of the vehicle tracking the sequence of intermediate goals by optimizing the motion of the vehicle subject to the second model; and generating and submitting control commands to at least one actuator of the vehicle to follow the motion trajectory.

* * * * *